(12) United States Patent
McKinnon, III et al.

(10) Patent No.: US 7,009,992 B2
(45) Date of Patent: Mar. 7, 2006

(54) METHODS OF ALLOCATING ACCESS ACROSS A SHARED COMMUNICATIONS MEDIUM

(75) Inventors: Martin W. McKinnon, III, Atlanta, GA (US); Mani M. Subramanian, Atlanta, GA (US); Timothy Sean Sotack, Atlanta, GA (US); John Joseph Ehrley, Atlanta, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 881 days.

(21) Appl. No.: 09/800,735

(22) Filed: Mar. 7, 2001

(65) Prior Publication Data

US 2002/0126686 A1 Sep. 12, 2002

Related U.S. Application Data

(60) Provisional application No. 60/205,963, filed on May 19, 2000.

(51) Int. Cl.
G06F 17/30 (2006.01)

(52) U.S. Cl. ...................... 370/443; 370/468
(58) Field of Classification Search ............... 370/252, 370/442, 443, 465, 468
See application file for complete search history.

(56) References Cited

U.S. PATENT DOCUMENTS

| | | | |
|---|---|---|---|
| 5,491,694 A | 2/1996 | Oliver et al. | |
| 5,581,555 A | 12/1996 | Dubberly et al. | |
| 5,594,726 A | 1/1997 | Thompson et al. | |
| 5,719,872 A | 2/1998 | Dubberly et al. | |
| 5,757,801 A | 5/1998 | Arimilli | |
| 5,790,546 A | 8/1998 | Dobbins et al. | |
| 5,857,193 A | 1/1999 | Sutcliffe et al. | |
| 5,935,218 A | 8/1999 | Beyda et al. | |
| 5,956,342 A | 9/1999 | Manning et al. | |
| 5,963,557 A | 10/1999 | Eng | |
| 5,963,963 A | 10/1999 | Schmuck et al. | |
| 6,046,980 A | 4/2000 | Packer | |
| 6,084,855 A | 7/2000 | Soirinsuo et al. | |
| 6,104,700 A | 8/2000 | Haddock et al. | |
| 6,115,390 A | 9/2000 | Chuah | |
| 6,438,141 B1 * | 8/2002 | Hanko et al. | 370/477 |
| 6,680,922 B1 * | 1/2004 | Jorgensen | 370/328 |

OTHER PUBLICATIONS

Data-Over-Cable Service Interface Specifications; Radio Frequency Interface Specification; SP-RFIv1.-I04-00047 Interim Specification; 2000 Cable Television Laboratories, Inc. pp. 229-231, 263; 121-141; 157-217; and 277-283.

International Engineering Consortium, Cable Data Network Standards [online] Web ProForum Tutorial Course, Aug. 3, 2000 [Retrieved on Dec. 18, 2000]. Retrieved from Internet at <URL:http://www.iec.org/tutorials/cable_mod/topic04.html?Next.x=40&Next.y=18>.

Ostergaard, Rolf V., Cable-Modems.Org: Your Cable Modem Reference Guide, [online] Tutorial 1998-2000 [Retrieved on Dec. 18, 2000]. Retrieved from Internet at <URL:http://www.cable-modems.org/tutorial>.

(Continued)

*Primary Examiner*—Ricky Ngo
*Assistant Examiner*—Derrick W Ferris

(57) ABSTRACT

A method of providing network access across a shared communications medium between competing users includes the steps of monitoring network access usage by each user for a past time interval and, based on the monitored network access usage, allocating network access for each user during a future time interval. Features include forecasting network access that will be utilized or requested by users in a future time interval, and prioritizing the users for allocating network access to the users.

47 Claims, 22 Drawing Sheets

OTHER PUBLICATIONS

Time Warner Cable, Road Runner Subscription Agreement, Jan. 1999, pp. 1-4.

White, Gerry, Eliminating Open Access Technology Barriers [online] Telecommunications Online Newsletter Article, Jul. 2000 [Retireved on Dec. 10, 2000]. Retrieved from the Internet at <URL:http://telecommagazine.com/issues/200007/tcs/elimin.html>.

Green, Tim, DSL Has A Secret [online] Network World Fusion Article, Mar. 2, 1999 [Retireved on Dec. 22, 2000]. Retireved from the Internet at <URL:http://cnn.com/TECH/computing/9903/02/dslsecretlidg/>.

Cable Television Laboratories, Inc., Cable Data Modem Performance Evaluation: A Primer For Non-Technical Readers, Nov. 15, 1996, pp. 1-8.

RiverDelta Networks Inc., QoS: The Key To Maximizing Revenue: A Technical Guide for Cable Operators [online] PDF Document, Publication Date Unknown [Retrieved on Dec. 18, 2000]. Retrieved from Internet at <URL:http://www.riverdelta.com>, pp.1-8.

Cable Television Laboratories, Inc., Cable Data Modem Performance Evaluation: A Primer For Non-Technical Readers, Apr. 1996, pp. 1-3.

Ddri Diversified Data Resources, Inc., ACE-SNMP Web Based SNMP Network Management System An Introductory Overview of SNMP, 1999.<URL:http://www.ddri.com> pp. 1-32.

Beauregard, Brian Conrad, Overview of the Cable Modem, WPI Department of Electrical and Computer Engineering [online] Technologies Course Homepage, Mar. 23, 1996 [Retrieved on Dec. 18, 2000]. Retrieved from the Internet at <URL:http://www.ece.wpl.edu.courses/ee535/hwk96/hwk4cd/bcbeau/node1.html>.

White, Gerry, Additions To Cable Spec Enable QoS [online] Article in Network World Fusion, Jun. 19, 2000 [Retrieved on Dec. 19, 2000].Retrieved from the Internet at <URL: http://www.nwfusion.com/cgl-bin/mailto/x.cgi>.

RiverDelta Networks, RiverDelta Networks Executive To Discuss Advanced Quality Of Service Techniques At Cable-Tec Expo 2000 [online] Press Release, May. 31, 2000 [Retrieved Dec. 19, 2000]. Retrieved from the Internet at <URL:http//www.riverdelta.com/pr053100html>.

RiverDelta Networks, RiverDelta Raises $10 Million To Bring Enhahced Broadband Services To Next-Generation Cable Providers [online] Press Release, Dec. 19, 1999 [Retrieved Dec. 19, 2000]. Retrieved from the Internet at <URL:http//www.riverdelta.com/pr121399.html>.

River Delta Networks, QoS: One HFC Network, Multiple Revenue Streams [online] White Papers, [Retrieved on Dec. 19, 2000]. Retrieved from the Internet at <URL:http//www.cabledatacomnews.com/whitepapers/paper08.html>.

Telecommunications Online, RiverDelta Networks (www.riverdelta.com)—A One-Box MSA Solution [online] Newsletter article, Jul. 2000 [Retrieved on Dec. 10, 2000]. Retrieved from the Internet at <URL:http://www.telecommagazine.com/products/200007/20000701.html>.

White, Gerry, QoS: Enabling Multiple Services on Cable Networks, [online] Telecommunications Online Newsletter Article, Oct. 2000 [Retrieved on Dec. 19, 2000]. Retrieved from the Internet at <URL:http://www.telecoms.mag.com/issues/200010/tcs/qos_enabling.html>.

International Engineering Consortium, How Cable Modems Work [online] Web ProForum Tutorial Couse, Aug. 3, 2000 [Retrieved on Dec. 18, 2000]. Retrieved from the Internet at <URL:http://www.iec.org/tutorials/cable_mod/topic01.html?Nest.x=34&Next.y=20>.

International Engineering Consortium, Cable Data System Features [online] Web ProForum Tutorial Course, Aug. 3, 2000 [Retrieved on Dec. 18, 2000]. Retrieved from the Internet at <URL:http://www.iec.org/tutorials/cable_mod/topic02.html>.

International Engineering Consortium, Cable Data Network Architecture [online] Web ProForum Tutorial Course, Aug. 3, 2000 [Retireved on Dec. 18, 2000]. Retrieved from the Internet at <URL:http://www.iec.org/tutorials/cable_mod/topic03.html>.

* cited by examiner

METHODS OF ALLOCATING ACCESS ACROSS A SHARED COMMUNICATIONS MEDIUM

CROSS-REFERENCE TO RELATED APPLICATION

This U.S. patent application claims priority under 35 U.S.C. 119 to the benefit of the filing date of U.S. provisional patent application Ser. No. 60/205,963, which was filed on May 19, 2000, and which is incorporated herein by reference. This application also incorporates herein by reference each of seven other U.S. patent applications to McKinnon et al. filed concurrently herewith in the U.S. Patent & Trademark Office and respectively bearing Ser. No. 09/800,155 ("Computerized Method For Allocating Access Across A Shared Communications Medium"); Ser. No. 09/800,608 ("Solicitations for Allocations of Access Across A Shared Communications Medium"); Ser. No. 09/800,674 ("Allocating Access Across A Shared Communications Medium"); Ser. No. 09/800,717 ("Monitoring and Allocating Access Across A Shared Communications Medium"); Ser. No. 09/800,803 ("Allocating Access Across A Shared Communications Medium of a DOCSIS 1.0 Compliant Cable Network"); Ser. No. 09/800,861 ("Allocating Access Across A Shared Communications Medium in a Carrier Network"); and Ser. No. 09/800,981 ("Allocating Access Across A Shared Communications Medium to User Classes"), each of which relates to allocating access across a shared communications medium and is similarly titled.

FIELD OF THE PRESENT INVENTION

The present invention generally relates to allocating access across a shared communications medium and, in particular, to allocating bandwidth used to convey data of competing users across a shared communications medium of a Carrier Network.

BACKGROUND OF THE PRESENT INVENTION

As used herein, a "Carrier Network" generally refers to a computer network through which users (such as homes and businesses) communicate with various service providers. The Carrier Network extends from the location of each user to an intermediate switched/routed network (hereinafter "Intermediate Network"). The service providers, in turn, are connected to the Intermediate Network, either directly or indirectly via the Internet, for communications with the users. The Carrier Network is maintained by a "Carrier," which also may serve as a service provider for certain services. For example, a Carrier or a related entity may serve as an Internet service provider (ISP).

Two prevalent types of Carrier Networks include a "Shared Access Carrier Network," in which data of multiple users are conveyed together over a shared communications medium between the users and the Intermediate Network, and a "Dedicated Connection Carrier Network," in which data of each user are conveyed alone between the user and the Intermediate Network and are not combined with data of other users. One of the most prevalent Shared Access Carrier Networks today is found in the Data-Over-Cable (DOC) Network, which includes the traditional network constructed from coaxial cable and the hybrid fiber coaxial (HFC) network constructed with both fiber optical cabling and coaxial cable. Other Shared Access Carrier Networks include wireless and digital subscriber line (xDSL) networks (the xDSL lines typically being aggregated onto an oversubscribed backhaul trunk into the Intermediate Network, with the trunk defining the shared communications medium).

For example, with regard to DOC Networks, and with reference to FIG. 1 wherein a conventional DOC Network 40 is illustrated, data packets are transmitted in a downstream direction from a cable modem termination system (CMTS) 30, which is located in a headend 36 (or distribution hub) of a Carrier, over a coaxial cable 32 to respective cable modems (CMs) 34 of users. All of the CMs 34 are attached by the coaxial cable 32 to the CMTS 30 in an inverted tree configuration, and each CM 34 connected to the coaxial cable 32 listens to all broadcasts from the CMTS 30 transmitted through the coaxial cable 32 for data packets addressed to it, and ignores all other data packets addressed to other CMs 34. Theoretically, a CM 34 is capable of receiving data in the downstream direction over a 6 MHz channel with a maximum connection speed of 30–40 Mbps. Data packets also are transmitted in the upstream direction over a 2 MHz channel by the CMs 34 to the CMTS 30 typically using time division multiplexing (TDM) and at a maximum connection speed of 1.5–10 Mbps.

The headend 36 in the DOC Network 40 includes a plurality of CMTSs, with each CMTS supporting multiple groups of CMs each connected together by a respective coaxial cable. Each such group of CMs connected to a CMTS defines a Shared Access Carrier Network, with the coaxial cable in each representing the shared communications medium. This arrangement of a group of CMs connected to a CMTS by a coaxial cable is referred to herein as a "Cable Network." Accordingly, the DOC Network 40 includes a plurality of Cable Networks 38 originating from CMTSs at the headend 36 of the Carrier, with a particular Cable Network 38 being illustrated in an expanded view in FIG. 1. The DOC Network 40 also includes multiple headends 36,64,66.

In contrast to the Shared Access Carrier Network, a user in the Dedicated Connection Carrier Network establishes a dedicated connection directly with the Intermediate Network for the transfer of data directly therebetween, and no data of other users travel over the dedicated connection. Examples of a dedicated connection are shown for comparison in FIG. 1 and include a connection established by a telephony modem 74 and a connection established by an ISDN modem 76. Both downstream and upstream connection speeds in a Dedicated Connection Carrier Network range from a maximum of 53 kbps in a telephony modem connection to a maximum of 128 kbps in a basic rate interface ISDN connection.

Connection speeds and, more importantly, throughput rate—the amount of data actually transmitted successfully in a given time interval—are important in minimizing downtime that users spend waiting for HTML documents to download from the Web. A Shared Access Carrier Network is considered superior to a comparable Dedicated Connection Carrier Network because the maximum instantaneous connection speed offered by the Shared Access Carrier Network is greater. A Shared Access Carrier Network is considered "comparable" to a Dedicated Connection Carrier Network where the entire bandwidth over a shared communications medium of the Shared Access Carrier Network equals an aggregate bandwidth that is divided between and dedicated to users in a Dedicated Connection Carrier Network. Accordingly, Shared Access Carrier Networks are able to offer significantly faster downloads of web documents, emails, and file transfers that are not considered available in Dedicated Connection Carrier Networks.

Furthermore, new multimedia applications and Internet services, such as voice and video communications via the Internet, now are offered which require even greater throughput rates for acceptable levels of service than that of the traditional Internet services, i.e., throughput rates greater than that required for acceptable text-based Web browsing, file transferring, and email communication. It is believed that these new multimedia applications and Internet services cannot adequately be provided for over Dedicated Connection Carrier Networks and that, consequently, Shared Access Carrier Networks ultimately will prevail as the predominant type of Carrier Network for Internet access by users.

Of course, the actual throughput rates experienced by a particular user rarely, if ever, will equate to the maximum connection speeds of which the Shared Access Carrier Network is capable because of the shared nature of the communications medium. For example, in a Cable Network the total bandwidths available over the shared cable in the downstream and upstream directions, which determine the respective maximum connection speeds, must be shared among all of the users communicating at a given time. Thus, rarely will a single user have available for use a large portion of the entire bandwidth in a particular direction. Further, as a Carrier adds users to the Cable Network, the actual downstream and upstream bandwidths available to the user—and thus throughput rates of the user—generally will decrease. A Carrier therefore must be careful to draw a balance between the number of users connected to a Cable Network and the performance users experience communicating over the network.

Unfortunately, Shared Access Carrier Networks that have been established were designed to provide the traditional Internet services, and not the new multimedia applications and Internet services that require higher throughput rates for acceptable levels of service. Consequently, each balance previously struck by Carriers in establishing Shared Access Carrier Networks was based on considerations of the throughput rates required for the traditional Internet services, and user throughput rates currently experienced by users in such networks are believed to fall short of acceptable quality of service (QoS) standards believed required in a Carrier Network for the new multimedia applications and Internet services.

Additionally, with regard to new Shared Access Carrier Networks that are being established, considerations of the new multimedia applications and Internet services tend to reduce the number of users that a Carrier now can reasonably expect to connect to the shared communications medium before degrading the performance levels of the new multimedia applications and Internet services. The balance is being shifted towards less users per shared access medium in exchange for higher throughput rates and, thus, higher QoS standards.

In an attempt to avoid reducing the number of users, it has been proposed, at least in DOC Networks, to discriminate between the traditional Internet services and the new multimedia applications and Internet services with regard to priority of data packet transmissions. In particular, the generally accepted standard in the United States governing communication protocols over cable is DOCSIS version 1.0, which was ratified by the International Telecommunication Union in March of 1998. DOCSIS stands for "Data Over Cable Service Interface Specifications." When DOCSIS 1.0 was developed, it was generally believed that, in view of the "fast" connection speeds of Cable Networks, the provision of bandwidth on a best effort basis would be sufficient to meet all user requirements.

Accordingly, each user subscribed to receive network access pursuant to a service level agreement (SLA) which provided for network access (or bandwidth in Cable Networks) only on a best effort basis. Now, in an effort to address the foreseen ever-increasing demand for higher throughput rates, DOCISIS version 1.1 has been proposed, in accordance with which each data packet transmitted over a DOC Network now must include a classification designation for prioritization purposes by network equipment. Subsequently, data packets representing voice or video, for example, now can be identified and given priority transmission over data packets representing email, file transfers, and text-based Web documents. A benefit of such flow classification is that, while overall bandwidth generally available to a user may otherwise remain unchanged, throughput rates of data for voice and video now may be provided at a higher rate than throughput rates of data for the traditional Internet services, thereby increasing the performance of voice and video applications and services while at least maintaining the traditional number of users connected to a Cable Network.

A disadvantage of the revisions to DOCSIS 1.1 is that the revisions do not enhance established Cable Networks constructed with only DOCSIS 1.0 compliant equipment, as such equipment does not support the added functionality of DOCSIS 1.1 so as to distinguish between data packets.

More broadly, another disadvantage of the classification of data packets into Internet Protocol (IP) flows based on the services represented by the data packets is that such classification discriminates against users who do not utilize multimedia applications and services receiving the prioritized transmissions. At least for some extensive users of the traditional Internet services, some degradation in performance may be noticed by lower classification of their data packets, particularly if the user engages in, for example, web hosting. While the transmissions of data packets for documents, files, and emails are not as time-sensitive as data packets for voice and video, increased data packet latency for documents, files, and emails, even if incrementally small, nevertheless will result in service degradation for large or numerous documents, files, and emails.

Accordingly, a need exists for a method and apparatus that will accommodate differing demands for network access by users competing for such access across a shared communications medium of a Shared Access Carrier Network, whether new or established, and irrespective of data packet classifications.

SUMMARY OF THE PRESENT INVENTION

Briefly summarized, the present invention relates to a method of providing network access across a shared communications medium between competing users. The method broadly includes the steps of monitoring network access usage by each user for a past time interval and, based on the monitored network access usage, allocating network access for each user for a future time interval. In a feature of the present invention, network access usage of each user is forecast for a future time interval based on the monitoring, and allocations are made based on the forecasting. Another feature of the present invention includes the prioritizing of the users for allocating network access.

A preferred method of providing network access to the users includes the steps of: (a) monitoring network access usage by each user during a time interval; (b) based on the monitoring, forecasting network access usage by each user over a future time interval; (c) prioritizing users based on each user's forecasted network access usage in increasing order, whereby a user with a lesser forecasted network access usage receives a higher priority than a user with a greater forecasted network access usage; and (d) allocating network access available to each user during the future time interval in decreasing order of user priority, with each user's allocation of network access being equal to each user's forecasted network access usage subject to a respective, predetermined maximum value and subject to availability.

Another preferred method of providing network access to the users includes the steps of: (a) monitoring network access usage by each user during a time interval; (b) based on the monitoring, forecasting network access usage by each user over a future time interval; and (c) allocating network access available to each user during the future time interval, with each user's allocation of network access being equal to each user's forecasted network access usage multiplied by a ratio of the total network access available for allocation to the total forecasted network access usage of all users, and subject to a respective, predetermined maximum value and subject to availability.

A third preferred method of providing network access to the users includes the steps of: (a) charging each user a respective fee for network access usage; (b) monitoring network access usage by each user during a time interval; (c) based on the monitoring, forecasting network access usage by each user over a future time interval; (d) prioritizing users based on each user's fee in decreasing order, whereby a user having a greater fee receives a higher priority than a user having a lesser fee; and (e) allocating network access available to each user during the future time interval in decreasing order of user priority, with each user's allocation of network access being equal to each user's forecasted network access usage subject to a respective, predetermined maximum value and subject to availability.

Yet a fourth preferred method of providing network access to the users includes the steps of: (a) applying respective credits to users for network access shortfalls below respective levels of network access specified to the users; (b) monitoring network access usage by each user during a past time interval; (c) based on the monitoring, forecasting network access usage by each user over a future time interval; (d) prioritizing users based on each user's respective credit in decreasing order, whereby a user having a greater credit receives a higher priority than a user having a lesser credit; and (e) allocating network access available to each user during the future time interval in decreasing order of user priority, with each user's allocation of network access being equal to each user's forecasted network access usage subject to a respective, predetermined maximum guaranteed value and subject to availability.

BRIEF DESCRIPTION OF THE DRAWINGS

Further features and benefits of the present invention will be apparent from a detailed description of preferred embodiments thereof taken in conjunction with the following drawings, wherein like elements are referred to with like reference numbers, and wherein.

DETAILED DESCRIPTION OF PREFERRED EMBODIMENTS

In the following detailed description, numerous specific details are set forth with regard to preferred embodiments of the present invention in order to provide a thorough understanding of the present invention; however, it will be apparent to ordinary artisans that the present invention may be practiced without all of these specific details. Well-known structures and devices also are shown in block diagram form, the specific details of which are not considered a necessary part of the present invention. Furthermore, as will become apparent to ordinary artisans, the present invention may be embodied in or performed by hardware, firmware, or software, or various combinations thereof.

Figure 1:
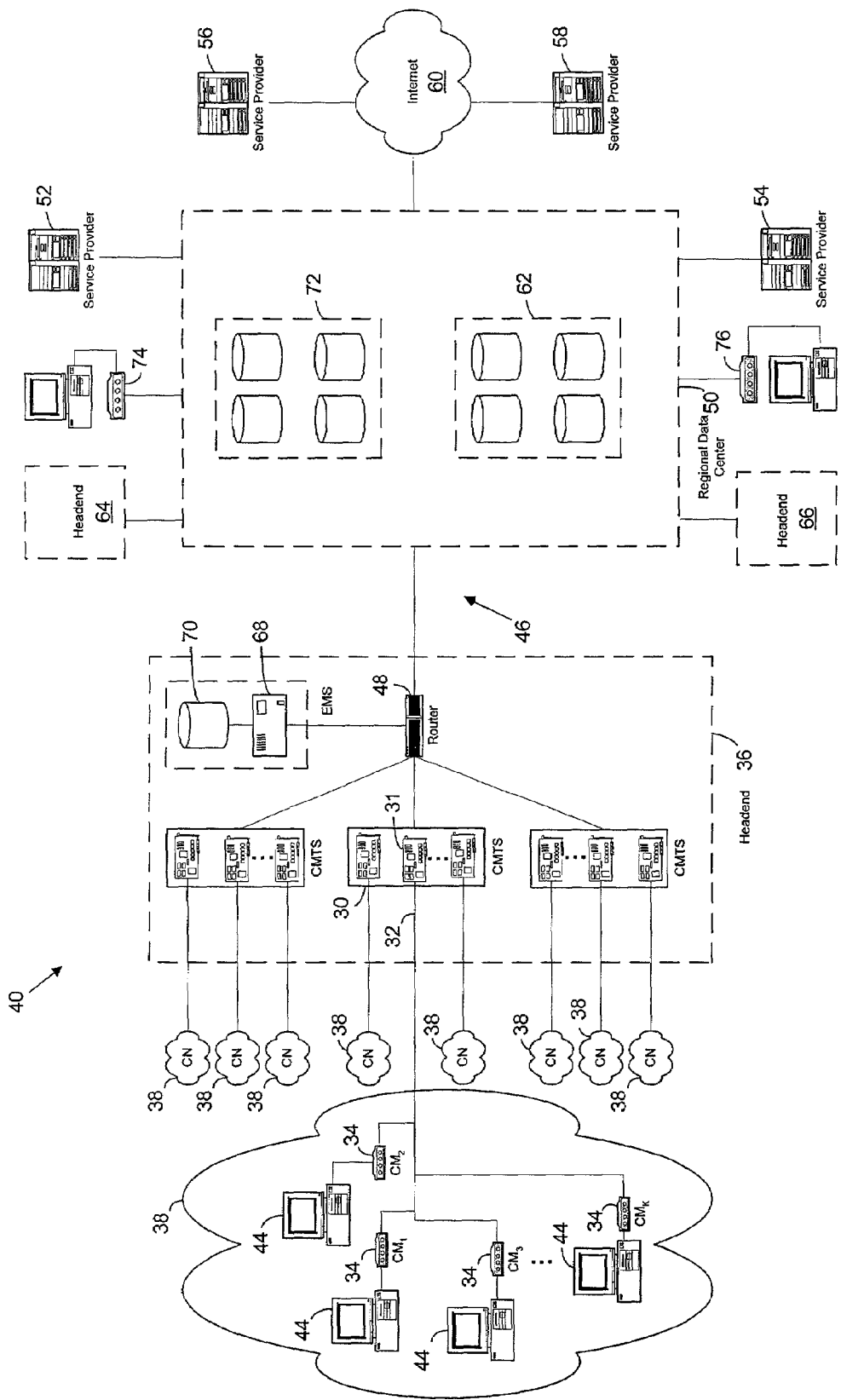
FIG. 1 illustrates a conventional DOC Network.

As described above, a conventional DOC Network 40 is shown in FIG. 1 and includes a plurality of Cable Networks 38, with a particular Cable Network 38 being illustrated in an expanded view and comprising a group of CMs 34, each connected to a computer 44 representing a user. Additionally, as used herein, "user" includes not only a person who interacts with a computer 44, but any additional persons who also interact with the same computer 44, as well as any group of persons all of whom interact with computers attached either to the same CM 34 or to the same computer 44 which, itself, is attached to a CM 34. While not shown, such additional arrangements are well known in the art.

The CMs 34 are connected by a coaxial cable 32 with a CMTS 30 and, specifically, to a card 31 mounted within the CMTS 30. Each of the CMTSs of the DOC Network 40 preferably includes a plurality of cards, with each card supporting a group of CMs connected thereto in an inverted tree configuration to define a Cable Network 38. Furthermore, each CMTS conventionally supports up to 1,500 users, although recent CMTSs have been introduced that support up to 15,000 users.

Each Cable Network 38 defines a Shared Access Carrier Network, wherein data of respective users in each are conveyed together through a shared coaxial cable. For instance, data packets (or frames) addressed to at least one of the computers 44 are transmitted by the CMTS 30 downstream over the coaxial cable 32 to all of the CMs 34 within a 6 MHz data channel. Conversely, data packets intended for delivery to the CMTS 30 and beyond are transmitted by a CM 34 upstream to the CMTS 30 over the coaxial cable 32 within a 2 MHz channel.

The Cable Network 38 shown in expanded view in FIG. 1 is a traditional all coaxial cable network. The other Cable Networks 38 collectively include both traditional all coaxial cable networks as well as HFC networks.

The CMTS 30 transmits and receives data packets between the Cable Networks 38 and an Intermediate Network 46, which begins with a router 48 in the headend 36, and includes switched and routed network equipment at a Regional Data Center 50 that provides connectivity to service providers 52,54,56,58, either directly or through the Internet 60. In this regard, during user communications the router 48 conveys data packets from the CMTS 30 to the Regional Data Center 50 of the DOC Network 40 and, conversely, routes data packets received from the Regional Data Center 50 to the appropriate CMTS for delivery to a particular user. Data packets that are conveyed to the Regional Data Center 50, in turn, are directed on to an appropriate service provider 52,54 directly connected to the Regional Data Center 50, or to an appropriate service provider 56,58 indirectly connected to the Regional Data Center 50 via the Internet 60. Alternatively, data packets from users are conveyed to a server of an application server group 62 of the Regional Data Center 50, which includes, for example, servers supporting Web hosting, news, chat, SMTP, POP3, Proxy, cache and content replication, and streaming media.

The Cable Networks 38 stemming from headend 36 are maintained by a Carrier which also may maintain the Regional Data Center 50 as well as serve as a service provider. Moreover, the Carrier may maintain the Cable Networks of additional headends 64,66, or of only one or more of the headends 64,66. In any event, the Cable Networks that are maintained by the Carrier are administered on a daily basis through an element management system (EMS) 68. The EMS 68 comprises an operations system designed specifically to configure and manage CMTSs and associated CMs, and includes a CM database 70. Operational tasks performed by the EMS 68 include provisioning, day-to-day administration, and testing of various components of each CMTS. The EMS 68 typically is located at a central network operations center of the Carrier, but may be collocated at the headend 36 of the Carrier as shown in FIG. 1.

The DOC Network 40 is managed through a control plane server group 72 typically located at the Regional Data Center 50. The control plane server group 72 includes the usual servers necessary to run the DOC Network 40, such as user authorization and accounting servers, log control servers (Syslog), IP address assignment and administration servers (DHCP, TFTP), domain name servers (DNS), and DOCSIS control servers.

For purposes of comparison, two dedicated connections also are shown in FIG. 1, wherein a telephony modem 74 and an ISDN modem 76 are connected directly to the Intermediate Network 46 at the Regional Data Center 50. As will be immediately apparent, data conveyed over each dedicated connection is between a single user and the Intermediate Network 46, and is not combined with data of other users over a shared communications medium as in each Cable Network 38.

As is common in conventional Cable Networks 38 such as those shown in the DOC Network 40 of FIG. 1, when a CM comes online the CM is assigned a configuration file which, inter alia, sets a constant limit on the bandwidth that can be utilized in the downstream direction by the CM during any particular interval of time, and sets a constant limit on the bandwidth that can be utilized in the upstream direction by the CM during any particular interval of time. The configuration file also includes other parameters, such as the IP address for the CM.

The configuration file for each CM conventionally is obtained by the CM when first brought online, or when the CM is reset. The upstream and downstream bandwidth limits are predetermined by the Carrier or other appropriate entity, the determination of which is based on the expected number of users to be serviced by the particular Cable Network 38 to which the CM belongs.

With particular regard to data transmissions in the downstream direction, when the bandwidth limit is reached in receiving data within a particular time interval, the CM transmits a signal to the router 48 to cease further data forwarding for the remainder of the time interval. Thereafter, whereas any data received by a CMTS is relayed on to the CM as the data is received, any additional data received by the router 48 during the remainder of this time interval is stored for later transmission in a buffer up to a threshold limit and, thereafter, any further data received within the time interval is dropped.

With regard to data transmissions in the upstream direction, when the CM registers with the CMTS following receipt by the CM of its configuration file, the CM informs the CMTS of the constant bandwidth limit to be applied to upstream transmissions from the CM. Then, actual requests for bandwidth (i.e., requests for timeslots) for transmission of data in the upstream direction are submitted regularly by each CM to the CMTS. In response to the submissions, the CMTS schedules timeslots in a particular time interval to the CMs for exclusive transmission of data within each timeslot by a respective CM. However, the CMTS does not grant an amount of bandwidth (by assigning too many timeslots) to a particular CM that would exceed the constant bandwidth limit for the particular CM.

The timeslots are assigned to requesting CMs based on an established assignment policy. For example, timeslots may be assigned by the CMTS on a first-in-first-out basis, or timeslots may be assigned equally to the CMs that request bandwidth within a particular window of time. The requesting CMs also may be prioritized by the CMTS for assignment of the timeslots.

Figure 2:
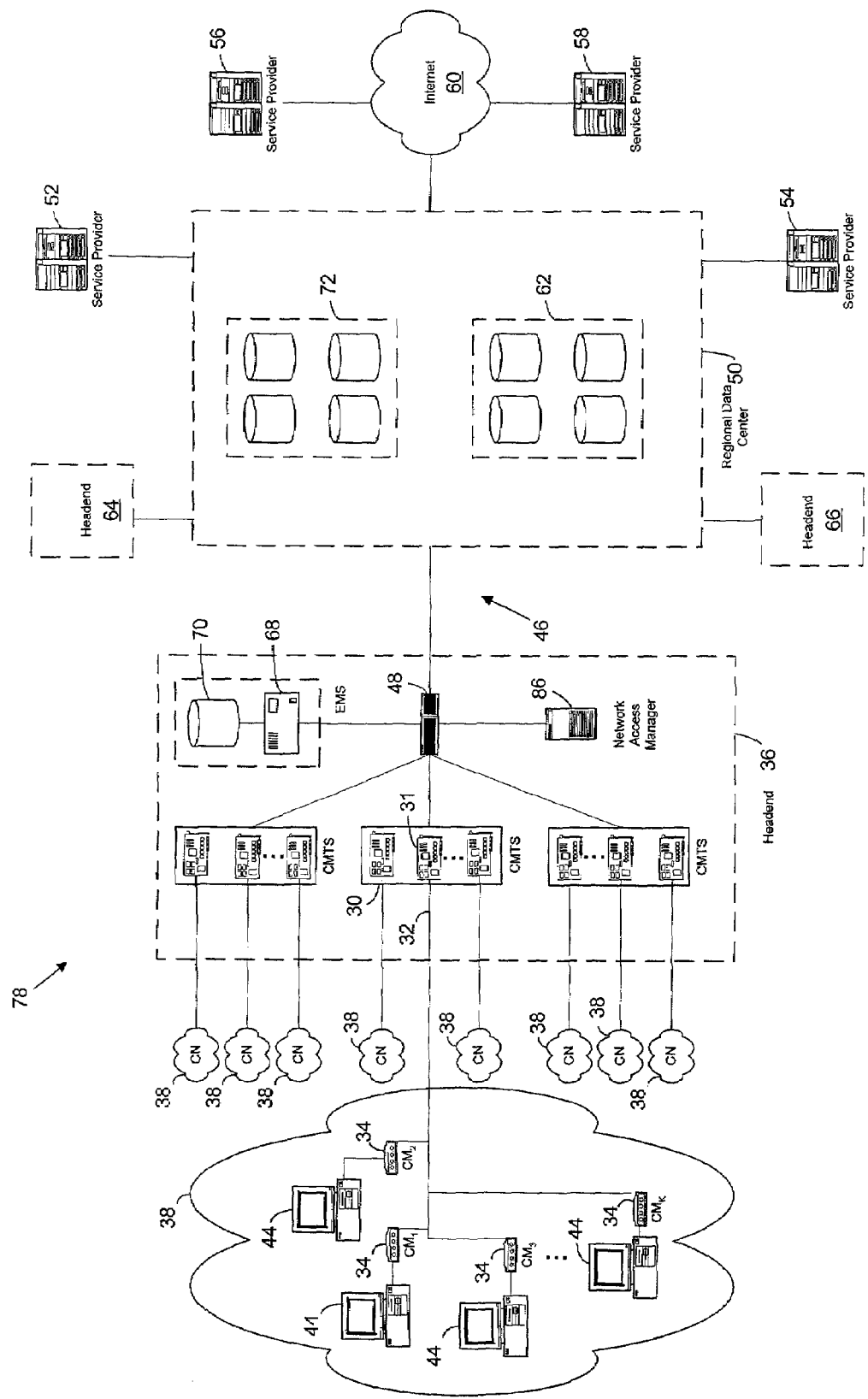
FIG. 2 illustrates a first DOC Network of the present invention.
Figure 3:
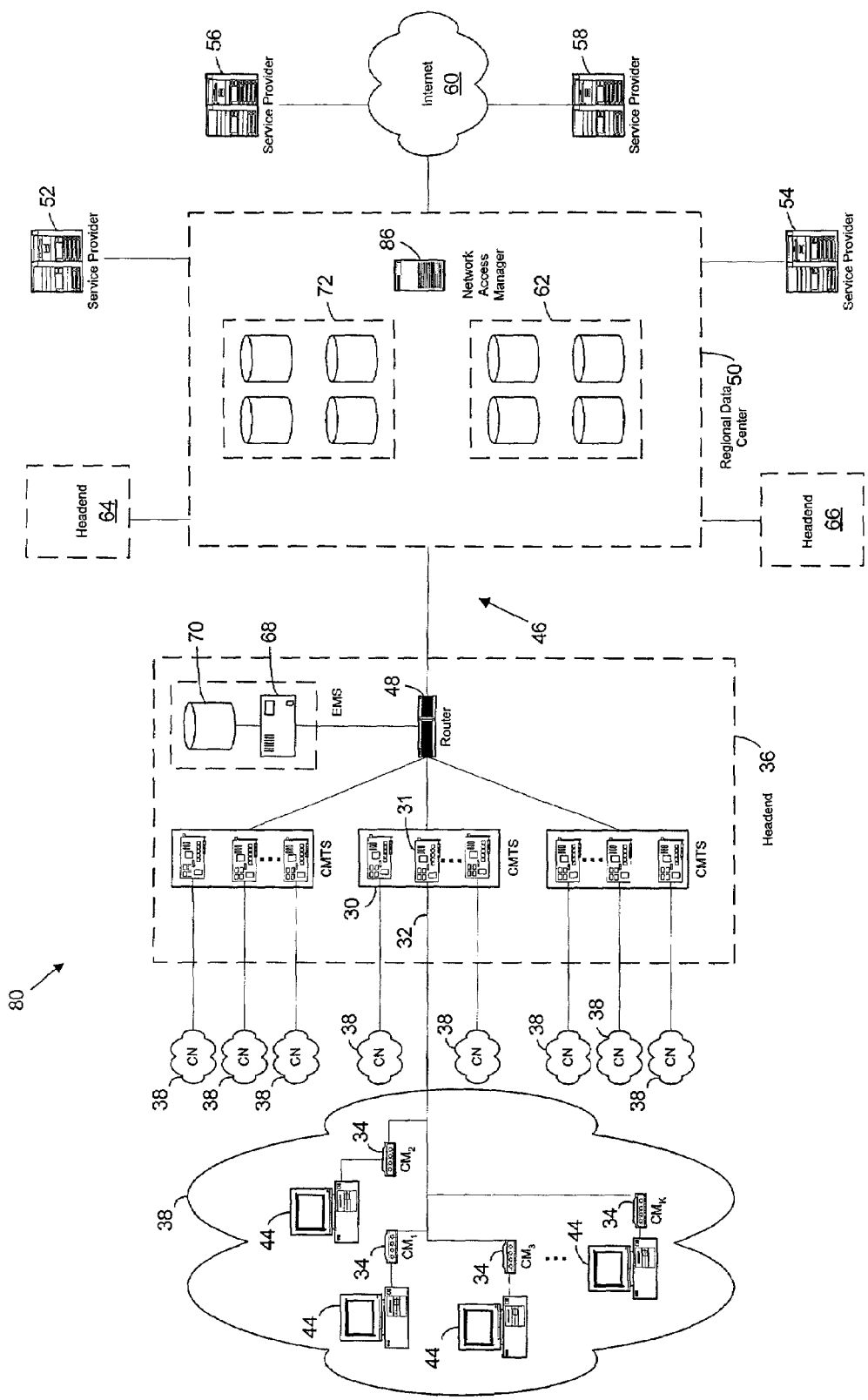
FIG. 3 illustrates a second DOC Network of the present invention.
Figure 4:
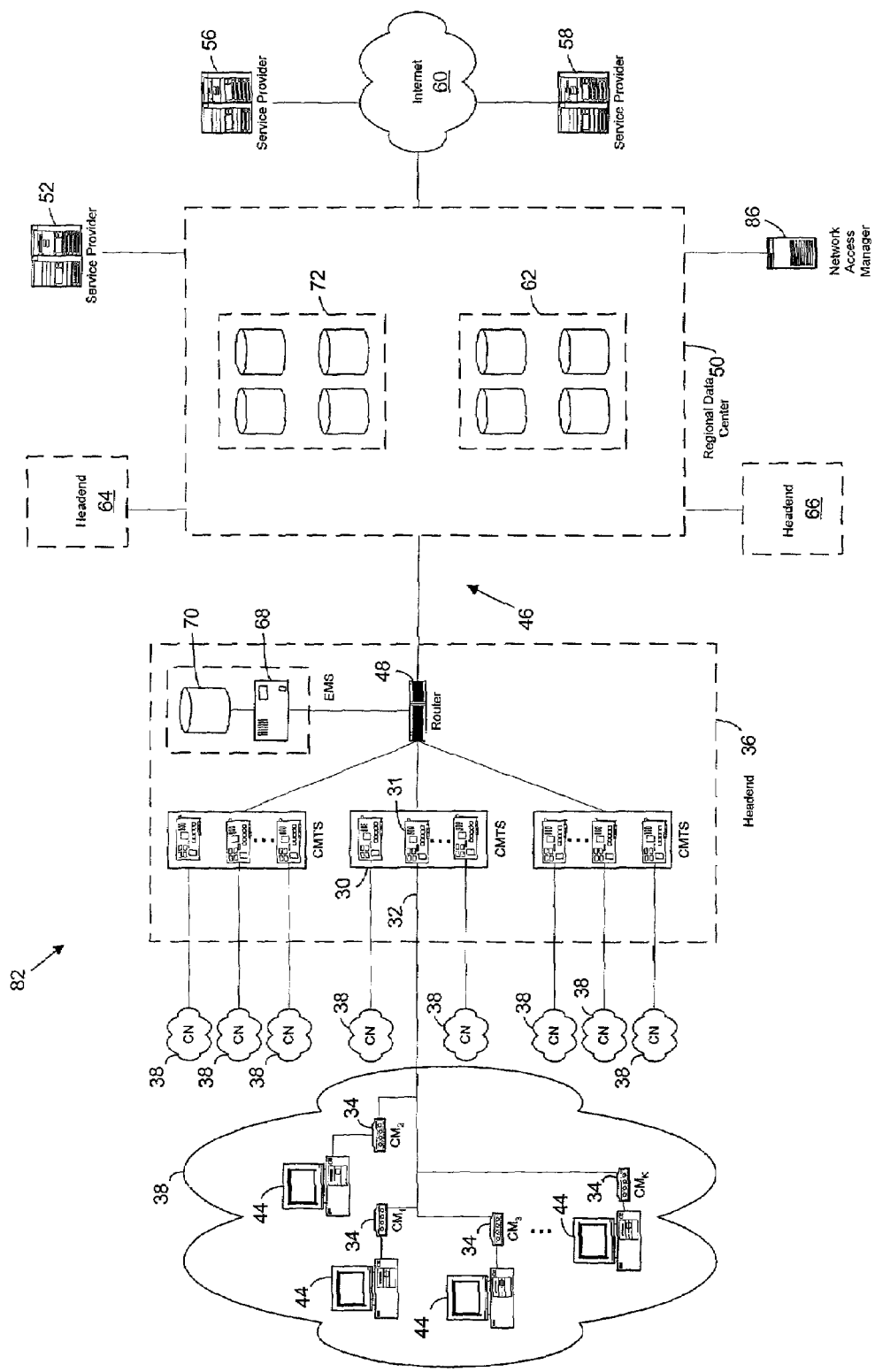
FIG. 4 illustrates a third DOC Network of the present invention.
Figure 5:
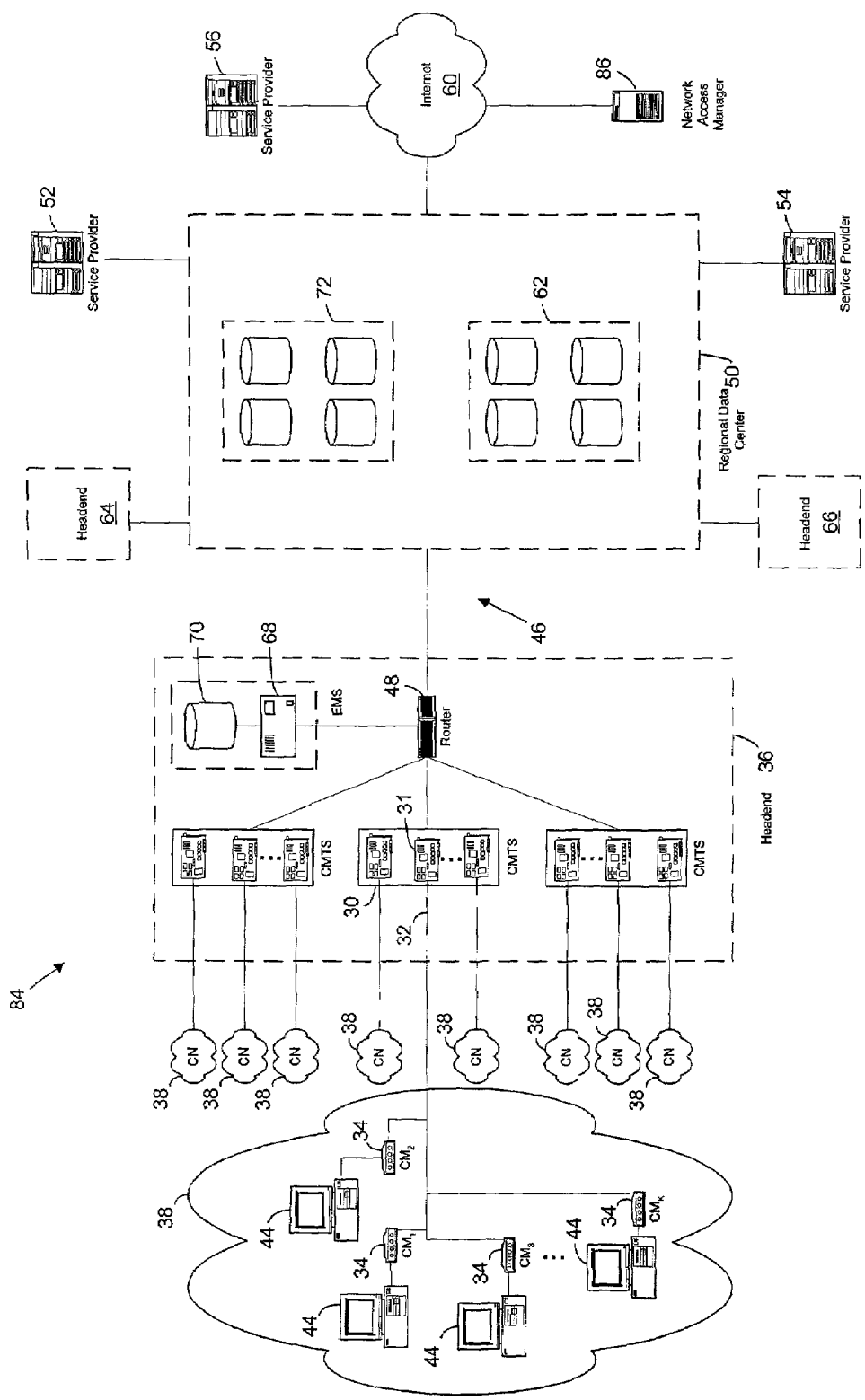
FIG. 5 illustrates a fourth DOC Network of the present invention.

Preferred embodiments 78,80,82,84 of a DOC Network in accordance with the present invention are shown, respectively, in FIGS. 2–5, wherein each includes a "network access manager" 86 in accordance with the present invention. In FIG. 2 the network access manager 86 is located in the headend 36 of the DOC Network 78, in FIG. 3 the network access manager 86 is located at the Regional Data Center 50 of the DOC Network 80, and in FIGS. 4–5 the network access manager 86 is remotely located, but is disposed for communication with the respective DOC Network 82,84, either directly as shown in the DOC Network 82 of FIG. 4, or indirectly via the Internet 60 as shown in the DOC Network 84 of FIG. 5.

The network access manager 86 preferably comprises a hardware component having software modules for performing methods in accordance with the present invention. For commercial purposes, especially in enhancing existing DOC Networks, preferably the network access manager 86 is self-contained and need only be connected in communication with the DOC Network to operate correctly. In a DOC Network that is being upgraded or established, preferably the software modules are distributed within the DOC Network itself and may or may not include any additional hardware components such as the network access manager 86. For example, the software modules may be incorporated into the EMS, CMTS, and control plane server group of a DOC Network, thereby avoiding the expense of additional computer hardware components.

Figure 6:
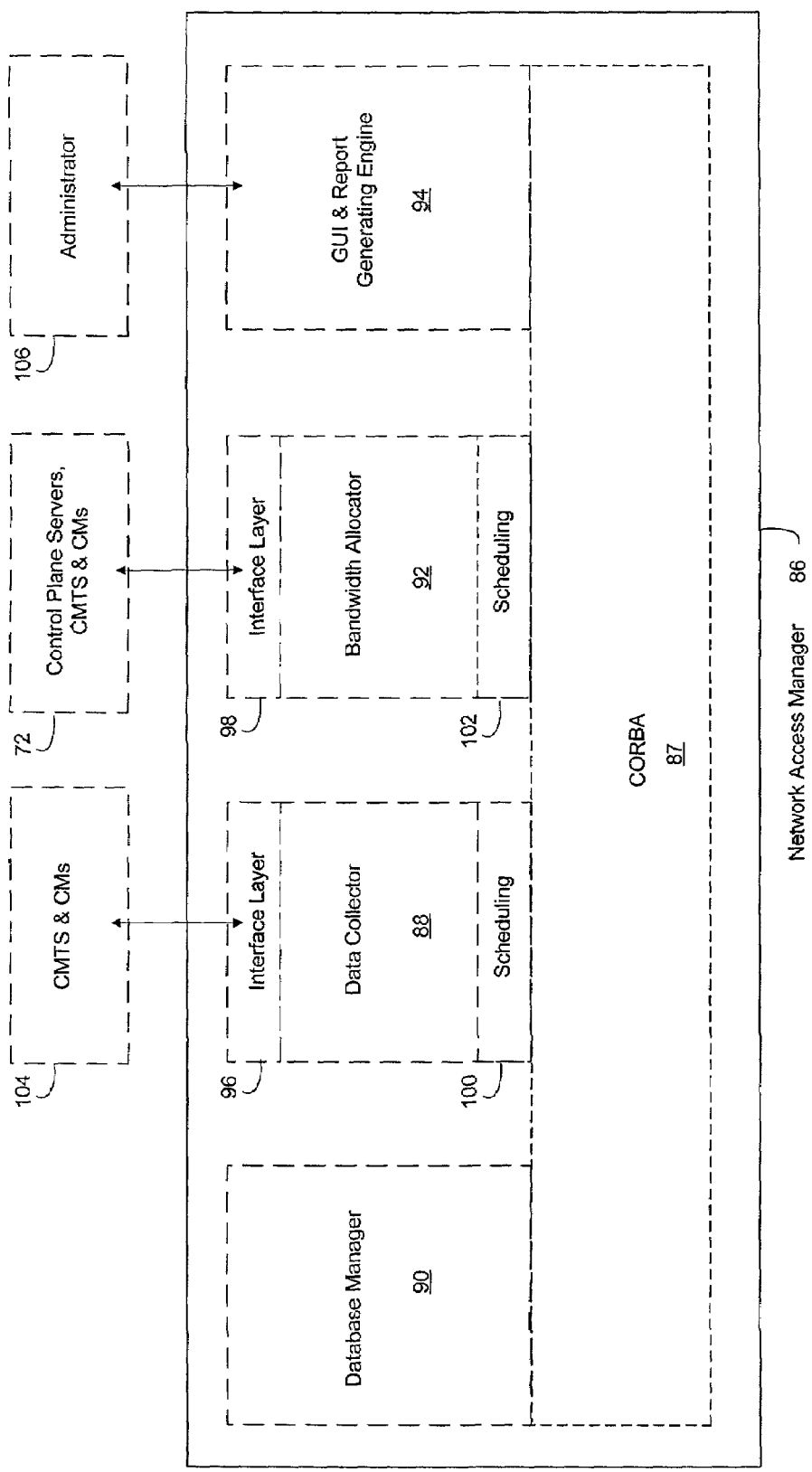
FIG. 6 illustrates a system architecture of software components that perform preferred methods of the present invention in the DOC Networks of FIGS. 2–5.

In order to accommodate deployment and implementation of the present invention, the software modules preferably are designed as peers within a messaging infrastructure and, in particular, within a CORBA infrastructure 87, the system architecture of which is shown in FIG. 6. Due to the interoperability of the peers to the CORBA infrastructure 87, the separate modules readily call upon each other as described in detail below without regard to differences in location between the modules. Nevertheless, for ease of deployment, the network access manager 86 is best suited for deployment and implementation of the present invention in established DOC Networks, whether situated within the Intermediate Network as in FIGS. 2–3, or remotely situated as in FIGS. 4–5.

The software modules include a Data Collector 88, a Database Manager 90, Bandwidth Allocator 92, and GUI & Report Generating Engine 94. The Data Collector 88 and Bandwidth Allocator 92 each includes an external system interface layer 96,98, respectively, that enables it to communicate with network equipment of a DOC Network. In the system architecture of preferred embodiments, the Data Collector 88 communicates with each CMTS and CMs of each Cable Network for which network access is managed by the network access manager 86, and the Bandwidth Allocator 92 communicates with the control plane server group 72 of the DOC Network as well as with the CMTS and CMs.

If a DOC Network is DOCSIS 1.0 compliant, then each external system interface layer 96,98 is a DOCSIS external system interface layer. If a DOC Network uses proprietary interface specifications, then each external system interface layer 96,98 is designed based on the proprietary interface specifications. In either case, however, the Data Collector 88 and Bandwidth Allocator 92 generally need not be modified; only the external systems interface layers 96,98 thereof need be changed based on the particularities of the DOC Network. Each of the Data Collector 88 and Bandwidth Allocator 92 also includes a scheduling element 100,102, respectively, that schedules the timing of actions and communications thereof with the network equipment of a DOC Network.

The GUI & Report Generating Engine 94 communicates with an Administrator 106 of the network access manager 86, preferably through a web server, whereby the Administrator 106 sets up and configures the network access manager 86 and accesses reports generated by the network access manager 86, such as graphs of bandwidth consumption and bandwidth requested per time interval for a user. The Administrator 106 may be the Carrier, a service provider, or some other entity, such as the entity managing the Regional Data Center 50 or a third-party responsible for maintenance of the network access manager 86.

The Database Manager 90 stores configuration and setup information received from the GUI & Report Generating Engine 94, as well as information processed by the Data Collector 88. The Database Manager 90 also provides information to the Bandwidth Allocator 92 and GUI & Report Generating Engine 94 as requested via the CORBA infrastructure 87.

Having now described in detail the structure of preferred DOC Networks 78,80,82,84, preferred methods of the present invention will be described with reference thereto.

In accordance with preferred methods of the present invention, network access usages of each user in the upstream and downstream directions are monitored through the Data Collector 88. Specifically, the Data Collector 88 issues queries to the CMTS and CMs to which counter values of logical data units (LDUs) are returned for the users. Preferably, counter values are returned for each user for the number of bytes and the number of data packets that are transmitted in both the upstream and downstream direction, the number of bytes and the number of data packets that are dropped in both the upstream and downstream direction, the number of bytes and the number of packets that are requested to be transmitted in the upstream direction, and the time for which the counter values are returned. Accordingly, as used herein the phrase "monitoring network access usage" is intended to refer to the collection of data representative of at least one of: (i) the number of LDUs that are transmitted in a particular direction across a shared communications medium; (ii) the number of LDUs that are dropped in transmitting in a particular direction across a shared communications medium; and (iii) the number of LDUs that are requested to be transmitted in a particular direction across a shared communications medium.

In a DOCSIS compliant DOC Network, the information is collected from the CMTS and CMs of a Cable Network via the simple network management protocol (SNMP). The counter values for bytes and data packets that are transmitted and that are dropped in the upstream direction from each CM, and the number of bytes and data packets that are requested to be transmitted in the upstream direction from each CM, are recorded by the CMTS in accordance with a management information base (MIB) of a DOCSIS compliant CMTS. Likewise, the counter values for bytes and data packets that are transmitted and that are dropped in the downstream direction from the CMTS to a CM are recorded by the CM in accordance with a MIB of a DOCSIS compliant CM. Both bytes and data packets are monitored since each data packet may vary in the number of bytes it contains.

The scheduling element 100 of the Data Collector 88 initiates the data collection from each CMTS and from the CMs connected thereto, preferably at different predetermined time intervals. For example, the data collection from a CMTS preferably occurs at five minute intervals and data collection from the CMs connected thereto preferably occurs at thirty minute intervals. The data collection from the CMs preferably is less often than the data collection from the CMTS in order to minimize consumption of bandwidth across the Cable Network that otherwise would be allocated to users.

When the counter values and time thereof are returned to the Data Collector 88, the Data Collector 88 calculates the change over time for each counter value to arrive at the average rates of bytes and data packets that are successfully transmitted, the average rates of bytes and data packets that are requested to be transmitted, and the average rates of bytes and data packets that are dropped. The respective rates and time intervals for the rates (as well as the counter values and time stamp data) are then communicated to the Database Manager 90, which stores the information in a user statistics table ("stats") for later use by the Bandwidth Allocator 92 and GUI & Report Generating Engine 94.

The Bandwidth Allocator 92, in turn, continually determines over succeeding time intervals an allowance of network access—or bandwidth in a Cable Network—that may be consumed by each user. As used herein, "network access allowance" refers to a respective maximum level of network access that may be made available to the user for utilization during a particular time interval and, accordingly, it may or may not represent the level of network access actually utilized by the user during such time interval.

Figure 18:
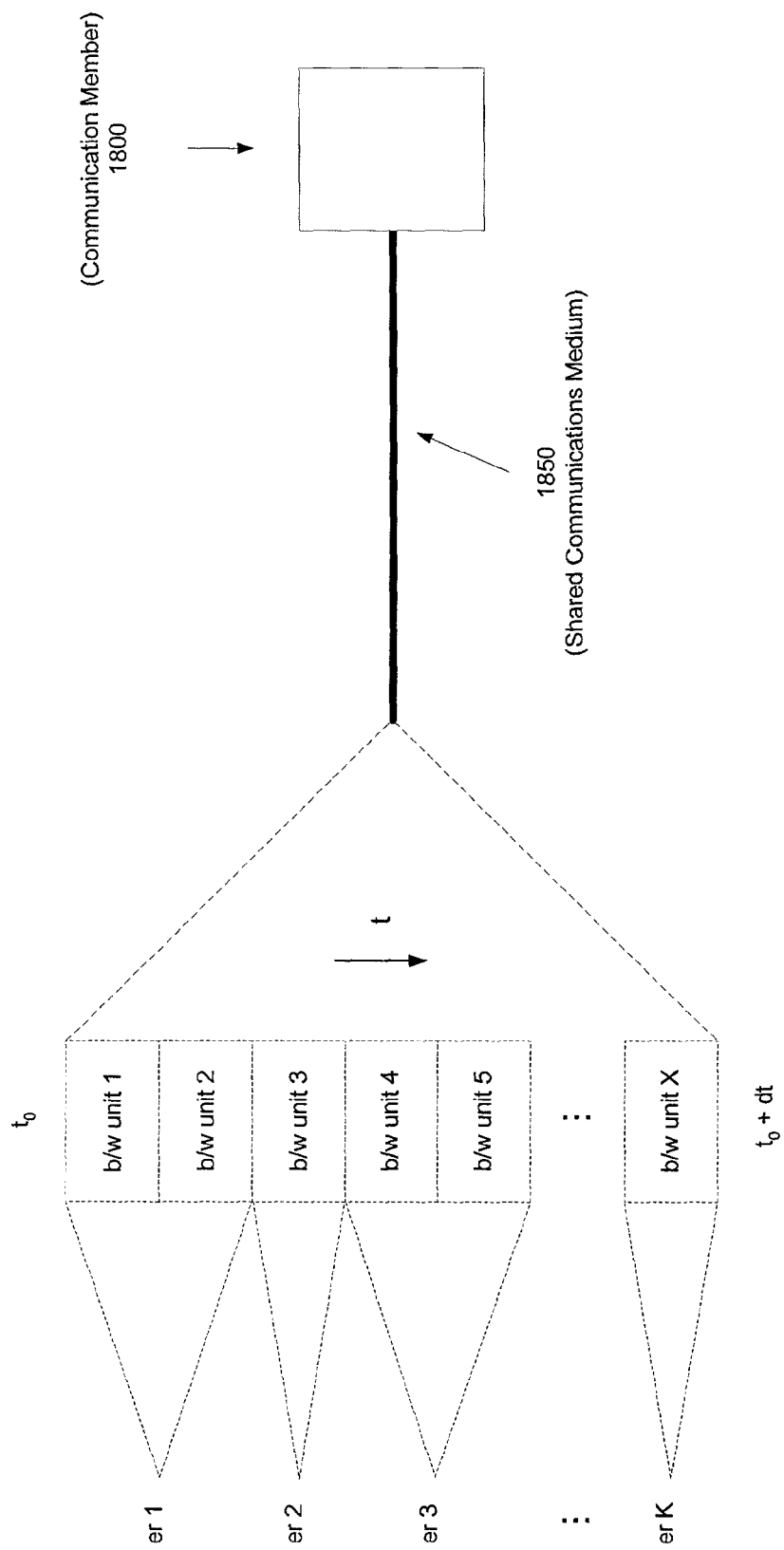
FIG. 18 illustrates the allocation of bandwidth to users during a first time interval.
Figure 19:
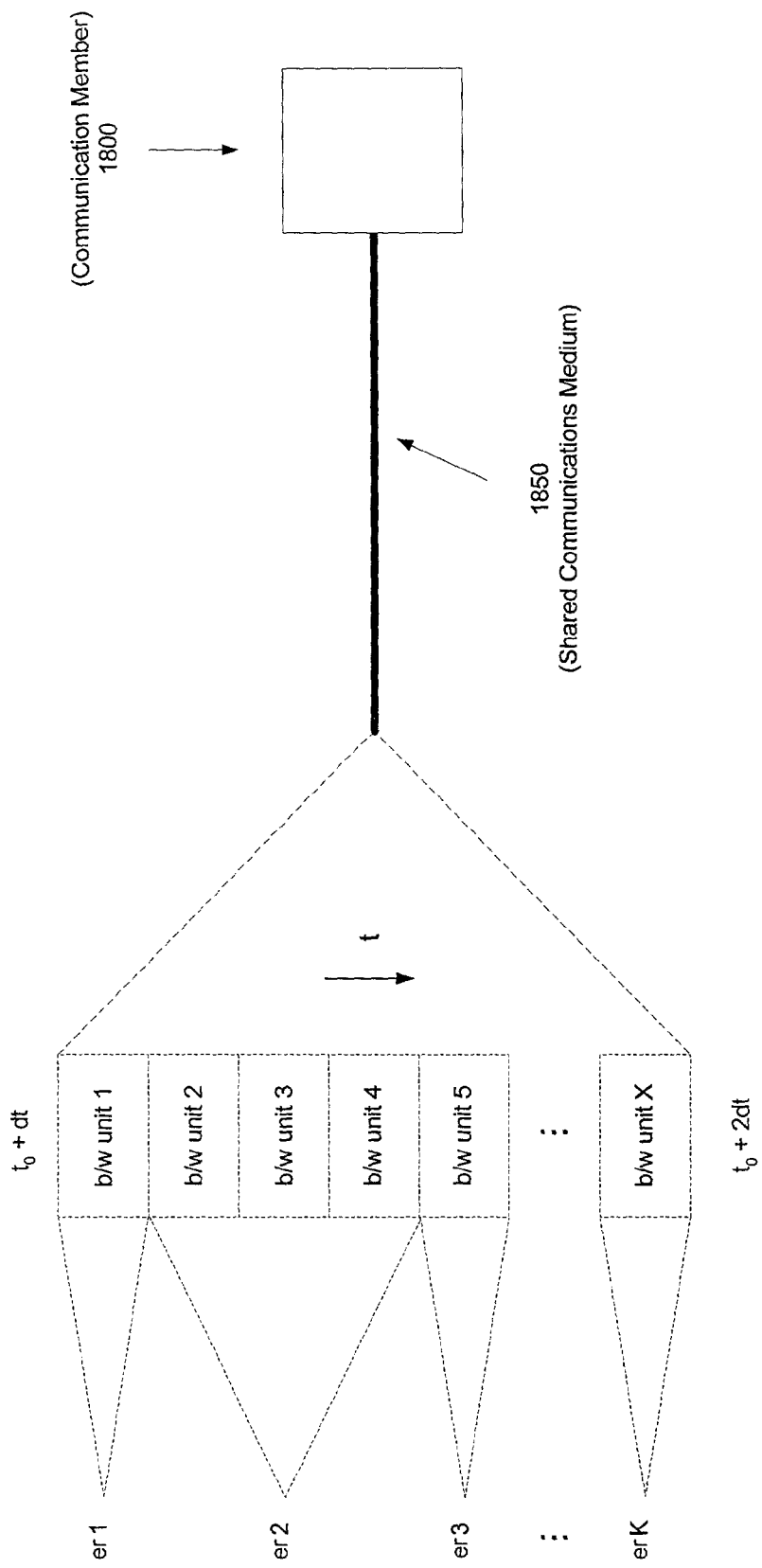
FIG. 19 illustrates the allocation of bandwidth to users during a second time interval.

The user bandwidth allowances are determined by equating the user bandwidth allowances to user allocations of bandwidth determined by allocating to the users the bandwidth that is available during a particular time interval in accordance with a selected allocation policy. For example, with reference to FIG. 18, a selected allocation policy has resulted in the allocation of bandwidth to the users of the shared communications medium 1850 for a time interval extending from $t_0$ to $(t_0+dt)$ wherein User 2 and User K each is allocated a single bandwidth unit (b/w unit 3 and b/w unit X, respectively), while User 1 and User 3 each is allocated two bandwidth units (b/w unit 1 and b/w unit 2 to User 1, and b/w unit 4 and b/w unit 5 to User 3). As shown in FIG. 19, in the next time interval extending from $(t_0+dt)$ to $(t_0+2dt)$, User 1, User 3, and User K each is allocated a single bandwidth unit (b/w unit 1, b/w unit 5, and b/w unit X, respectively), while User 2 is allocated three bandwidth units (b/w unit 2, b/w unit 3, and b/w unit 4). The bandwidth units broadly represent network access to the communication member 1800 that is shared between the users across the shared communications medium 1850.

In accordance with the present invention, respective user bandwidth allowances for each time interval are equated with these user allocations, and no user receives more bandwidth in a time interval than that user's respective bandwidth allowance for that time interval. Thus, bandwidth allocations under the present invention represent limits on bandwidth that can be utilized (or consumed) by users during a time interval, and do not represent per se the amount of bandwidth that actually will be utilized or consumed during the time interval.

In determining user bandwidth allowances in the preferred embodiments set forth herein, the Bandwidth Allocator 92 preferably performs three routines, including: the prediction of bandwidth of each user in a predetermined future interval of time ("First Routine"); the prioritization of users for allocation of bandwidth ("Second Routine"); and the determination of a respective bandwidth allocation as each user's bandwidth allowance for the future time interval ("Third Routine").

The First Routine preferably is performed utilizing statistical analysis of past bandwidth consumption of each user or, alternatively, past bandwidth requested for each user, and the forecasted bandwidth includes the bandwidth expected to be consumed by each user or, alternatively, the bandwidth expected to be requested by each user. Any function, method, or algorithm that generates an estimate of a future sample based on previously encountered samples may be used and many are well known in the art of statistical analysis as is evident from SPYROS MAKRIDAKIS ET AL., FORECASTING METHODS AND APPLICATIONS (3d. Ed. John Wiley & Sons 1998), which is hereby incorporated by reference.

Figure 7:
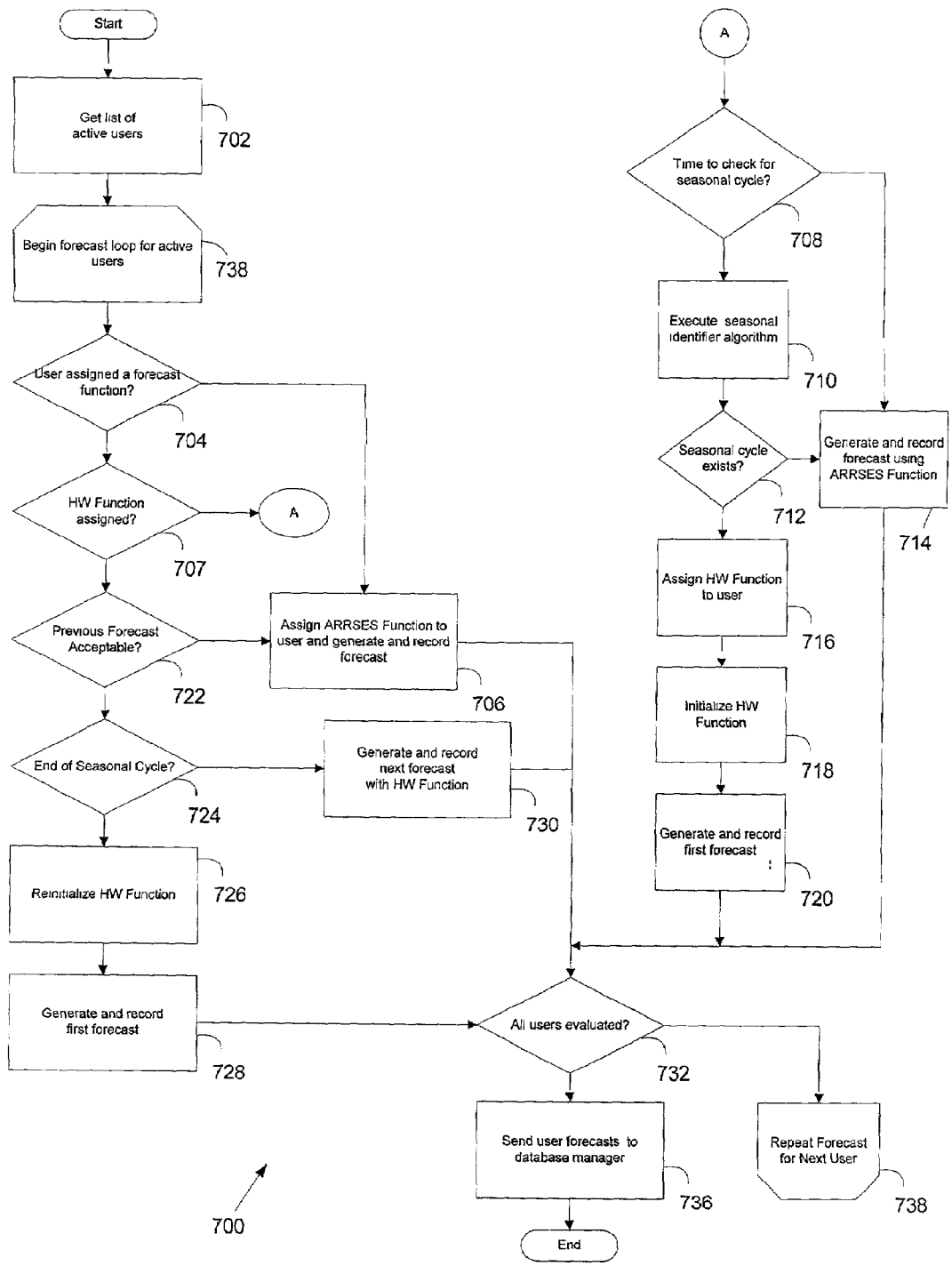
FIG. 7 illustrates a flowchart of the steps of a preferred routine for forecasting bandwidth of each user for a future time interval.

The preferred algorithm includes the combined use of an adaptive-response-rate single exponential smoothing function (ARRSES Function) and a Holt-Winters' seasonal exponential smoothing function (HW Function). These two functions are utilized according to the forecast generation flowchart of FIG. 7. The input includes a list of active users and applicable time intervals for bandwidth allocation.

The First Routine 700 begins by identification (Step 702) of the users of the Cable Network to which bandwidth is to be allocated in the Third Routine. Then, for each user, a bandwidth allowance for a succeeding time interval is predicted according to either the ARRSES Function or HW Function by first determining (Step 704) whether the user previously has been assigned a forecast function. If not, then in Step 706 the ARRSES Function is assigned to the user and the ARRSES Function is used to generate and record the forecasted bandwidth for the succeeding time interval.

On the other hand, if it is determined in Step 704 that a forecast function is assigned, but it is determined in Step 707 that the forecast function is not the HW Function, then a determination is made (Step 708) whether to check for a seasonal cycle of the user. This determination in Step 708 is made by checking the elapsed time since the last seasonal check was made, with a seasonal check being made after a predetermined period of time elapses. If the determination in Step 708 is affirmative, then a seasonal identifier algorithm is executed (Step 710), in which an autocorrelation function and a seasonal identifier function are performed. The autocorrelation function is well known in the art of statistical analysis, and is used to identify elements in a time series which are influential on a current observation of that same series. Based on the output of the autocorrelation function, the seasonal identifier function identifies possible seasonal cycles of the time series by identifying local maxima of the results of the autocorrelation function.

Based on the results of the seasonal identifier function, a determination is made (Step 712) whether an actual seasonal pattern exists. If a seasonal pattern is not found, or if it is not yet time to check for a seasonal cycle, then a forecast is generated and recorded (Step 714) using the ARRSES Function. If a seasonal pattern is found, then the HW Function is assigned (Step 716) to the user, the HW Function is initialized (Step 718), and the first forecast is generated and recorded (Step 720) using the HW Function.

If it is determined in Step 707 that the current function assigned to the user already is the HW Function, then the determination is made (Step 722) whether the last forecasted bandwidth was acceptable. This determination is made by comparing whether the forecasted bandwidth was within 10% of the actual bandwidth consumed or requested. If this determination in Step 722 is negative, then the ARRSES Function is assigned to the user and the new forecast is generated and recorded in accordance with the ARRSES Function (Step 706). If the last forecast is determined (Step 722) to have been acceptable, then a determination is made (Step 724) whether the seasonal cycle has ended. If the seasonal cycle has ended, then the HW Function is reinitialized (Step 726), and the first forecast of the next seasonal cycle is generated and recorded (Step 728) via the HW Function. If the seasonal cycle has not expired, then the next forecast is generated and recorded (Step 730) in accordance with the HW Function.

Following each of Step 706, Step 714, Step 728, and Step 730, the Bandwidth Allocator 92 determines (Step 732) whether the forecasting has been completed for all users and, if not, then repeats (Step 738) a forecast loop for a remaining user. If it is determined in Step 732 that all users have been evaluated, then the forecasts are communicated (Step 736) to the Database Manager 90 and the forecasting routine ends.

A forecast of bandwidth for a user in a future time interval is generated in accordance with the ARRSES Function via the following formulas:

$$F_{N+1}=F_N+\alpha_N(B_N-F_N)$$

$$\alpha_{N+1}=|SE_N/SAE_N|$$

$$SE_{N+1}=SE_N+\beta(B_{N+1}-F_{N+1}-SE_N)$$

$$SAE_N=\beta|(B_N-F_N)|+(1-\beta)SAE_{N-1}$$

wherein,
F is the bandwidth that is expected to be consumed by a user for a time interval (or the bandwidth that is expected to be requested by a user);
B is the bandwidth that is actually consumed by a user for the time interval (or the bandwidth that is actually requested by a user);
N is the present time interval;
N−1 is the previous (immediate past) time interval;
N+1 is the next (immediate future) time interval; and
β is a selected parameter affecting the responsiveness to change of the ARRSES Function when the bandwidth of a user changes between time intervals.

Bandwidth is predicted both for the 6 MHz channel in the downstream direction as well as the 2 MHz channel in the upstream direction. Preferably each time interval is thirty minutes in length, but preferably may range from fifteen minutes to sixty minutes in length when bandwidth is forecast in the downstream direction. Preferably each time interval is five minutes in length, but preferably may range from one minute to fifteen minutes in length when bandwidth is forecast in the upstream direction.

Figure 8:
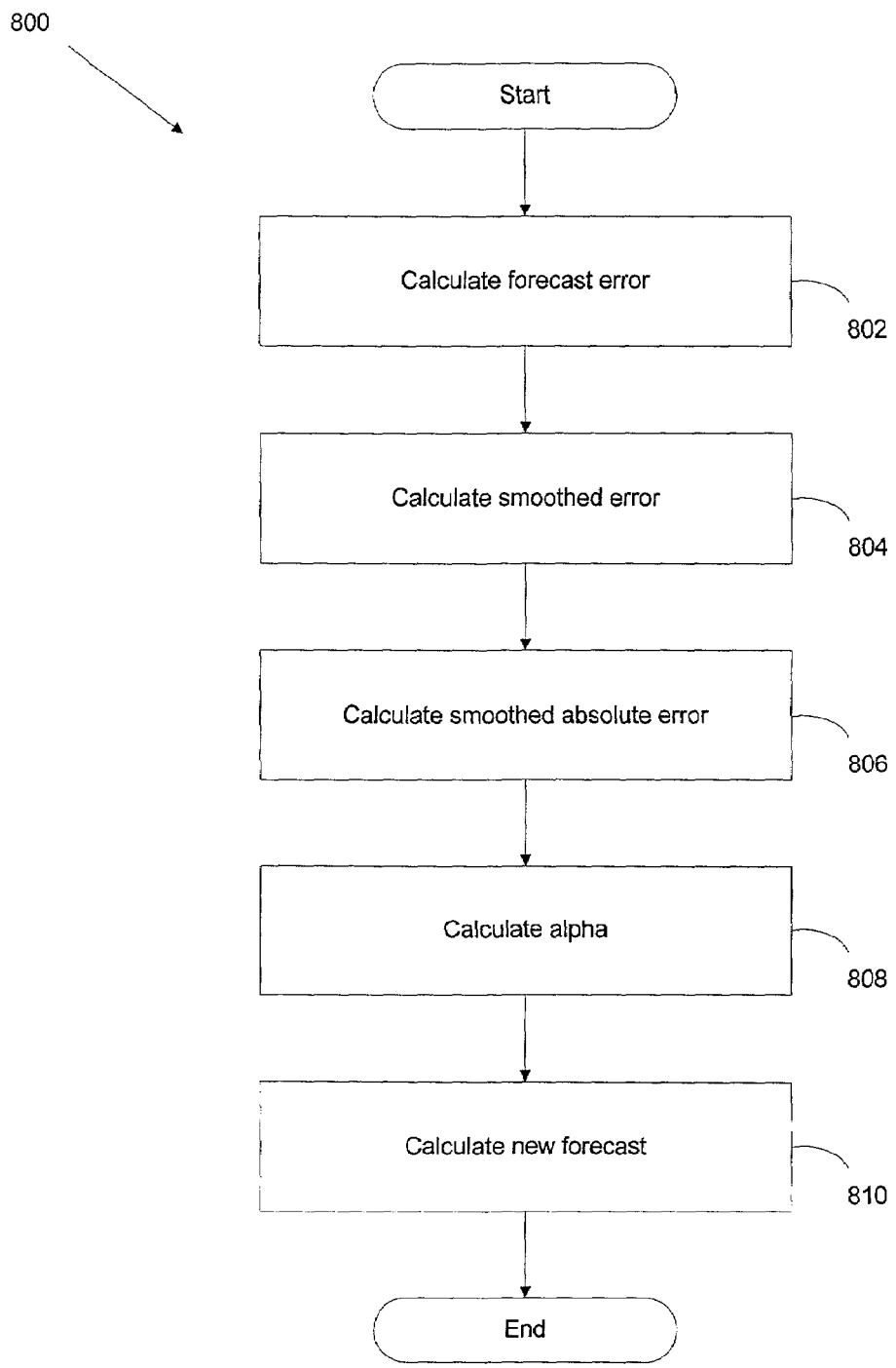
FIG. 8 illustrates a flowchart of the steps of generating a forecasted bandwidth for a user in accordance with the ARRSES Function of the preferred routine of FIG. 7.

The steps in generating a forecast in accordance with the ARRSES Function are set forth in FIG. 8, and include the calculation (Step 802) of a forecast error, the calculation (Step 804) of a smoothed error, the calculation (Step 806) of a smoothed absolute error, the calculation (Step 808) of alpha, and the calculation (Step 810) of the new forecast.

A forecast of bandwidth of a user for a future time interval is generated in accordance the HW Function via the following formulas:

$$L_s=1/s(Y_1+Y_2+\ldots+Y_s)$$

$$b_s=1/s[(Y_{s+1}-Y_1)/s+(Y_{s+2}-Y_2)/s+\ldots+(Y_{2s}-Y_s)/s]$$

$$S_1=Y_1/L_s, S_2=Y_2/L_s, \ldots S_s=Y_s/L_s$$

$$L_t=\alpha(Y_t/S_{t-s})+(1-\alpha)(L_{t-1}+b_{t-1})$$

$$b_t=\beta(L_t-L_{t-1})+(1-\beta)b_{t-1}$$

$$S_t=\gamma Y_t/L_t+(1-\gamma)S_{t-s}$$

$$F_{t+m}=(L_t+b_t m)S_{t-s+m}$$

wherein,
$L_i$=an average level of bandwidth after time interval i,
$b_i$=the trend after time interval i,
$s_i$=the seasonal influence at time interval i,
s=length of seasonal cycle (in number of time intervals),
$Y_i$=monitored bandwidth consumed or requested in time interval i,
t=time of initialization,
m=the number of time intervals into the future for which a forecast is made,
and
α, β, and γ are parameters of the forecast method whose values are determined by doing a grid search over the domain of possible values of these parameters in an attempt to minimize the mean-squared-error of the forecast method, each of α, β, and γ falling between 0 and 1.

Figure 9:
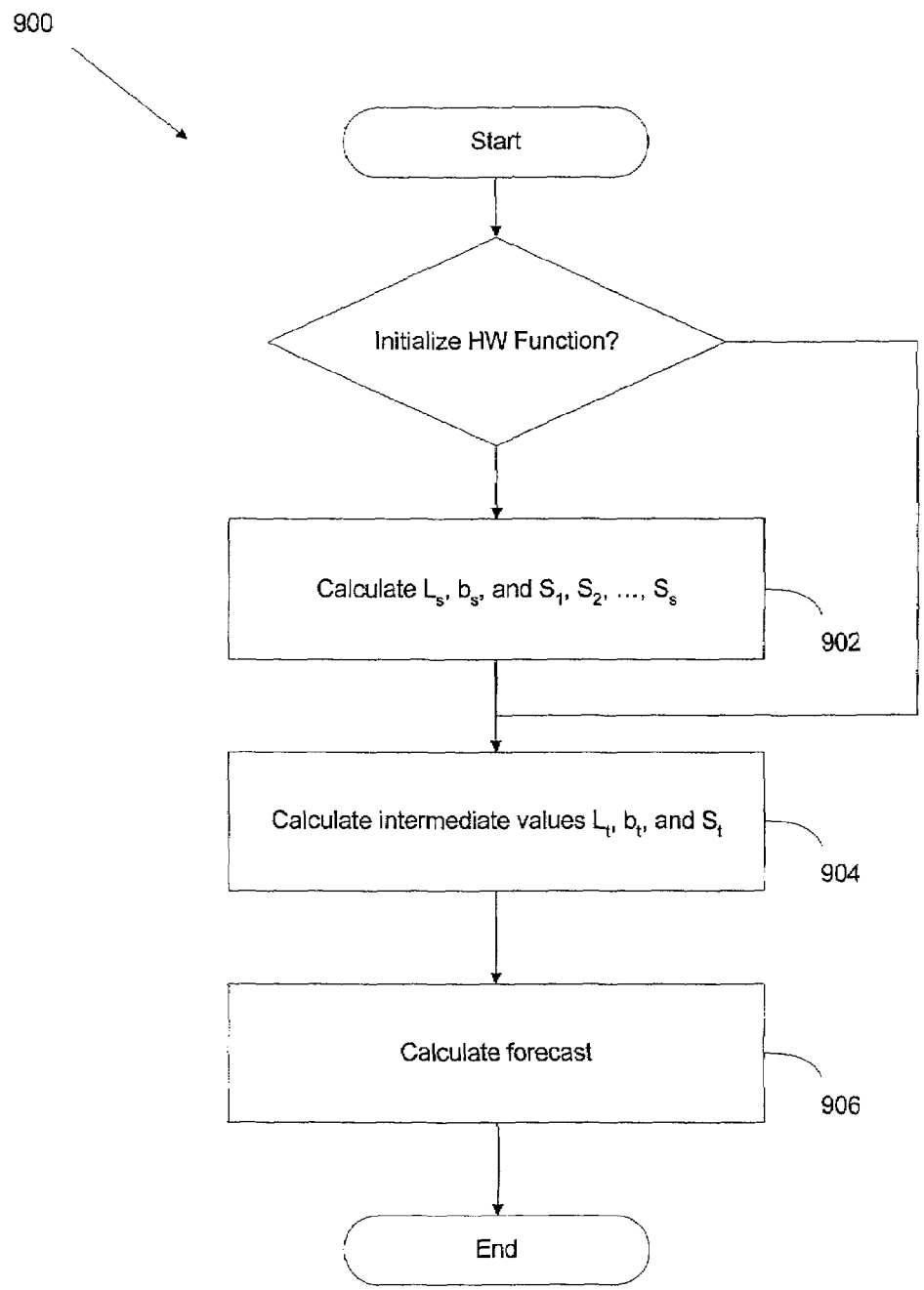
FIG. 9 illustrates a flowchart of the steps of generating a forecasted bandwidth for a user in accordance with the HW Function of the preferred routine of FIG. 7.

The steps in generating a forecast in accordance with the HW Function are set forth in FIG. 9, and include the initialization of the HW Function by determining $L_s$, $b_s$, and $S_1, S_2, \ldots, S_s$ in Step 902, if appropriate; the determination of the intermediate values of $L_t$, $b_t$, and $S_t$ in Step 904; and the determination of the forecast in Step 906, all in accordance with the above formulas.

The Second Routine performed by the Bandwidth Allocator 92 comprises the prioritizing of users for resolving competition between users during the determination of bandwidth allocations in the Third Routine. Prioritization is performed in accordance with one or more of various possible prioritization policies. The prioritization policies may depend upon, for example, (i) each user's SLA, (ii) each user's forecasted bandwidth, (iii) fairness considerations, or (iv) any combination thereof.

SLAs that at least partially affect prioritization policies include those that specify, for example: (i) a guaranteed minimum level of bandwidth; (ii) a time-of-day (TOD) minimum level of bandwidth; or (iii) a guaranteed minimum level of bandwidth up to a maximum burstable level of bandwidth with target probability.

Under a SLA providing for a guaranteed minimum level of bandwidth, a user will have a guaranteed minimum level of bandwidth for use at all times. Accordingly, if the available bandwidth to such a user otherwise would fall below the minimum guaranteed level, then such a user is given priority over all other users whose guaranteed minimum levels of bandwidth (if applicable) have been satisfied.

Similarly, under a SLA providing for a TOD minimum level of bandwidth, a user will have a guaranteed minimum level of bandwidth for a particular TOD. If the available bandwidth to such a user otherwise would fall below the minimum guaranteed level during the particular TOD, then such user is given priority over all other users whose guaranteed minimum levels of bandwidth (if applicable) have been satisfied.

Finally, under a SLA providing for a guaranteed minimum level of bandwidth up to a maximum burstable level of bandwidth with target probability, a user will have a guaranteed minimum level of bandwidth at all times and, in addition thereto, probably will have additional bandwidth up to a maximum level at any given time in accordance with the target probability. Accordingly, if the bandwidth available to such user otherwise would fall below the minimum guaranteed level, then the user is given priority over all other users whose guaranteed minimum levels of bandwidth (if applicable) have been satisfied. The user also is given priority over such other users in allocating additional bandwidth as needed up to the maximum level in accordance with the target probability.

Other SLA provisions not relating to guaranteed levels of bandwidth also may affect a prioritization policy. Thus, for example, each user's SLA may specify a fee (in dollars per unit time per unit bandwidth) that is paid by the user based upon bandwidth consumption by the user for a particular amount of time, and the fee may be different as between users or different groups of users. Under these circumstances, prioritization may be determined so as to maximize fee revenues that are paid by the users.

Similarly, each user's SLA may specify a credit (in dollars per unit time per unit bandwidth) that is applied by the Carrier to the user's account based upon a bandwidth shortfall to the user for a particular amount of time when a guaranteed level of bandwidth available to the user is not met. Moreover, the credit may be different as between users or different groups of users. Under these circumstances, prioritization may be determined so as to minimize the collective credit payments that a Carrier applies to user accounts.

An example of prioritization based upon the forecasted bandwidth of each user includes giving priority to a first user over all other users, each of whom have a forecasted bandwidth that is greater than that of the first user.

Prioritization may also be performed based on unilateral fairness considerations, especially when user SLAs do not guarantee minimum levels of bandwidth for individual users or when users otherwise would share equally in priority. Thus, users may be prioritized based on, for example: (i) the throughput of each of the users for a given time interval, with priority going to the user with the lesser throughput; (ii) data packets dropped over a given time interval, with priority going to the user with the greater data loss; and (iii) throughput experienced during a particular time of day or day of the week, with priority going to the user with the lesser throughput for the particular time of day or day of the week.

Figure 10:
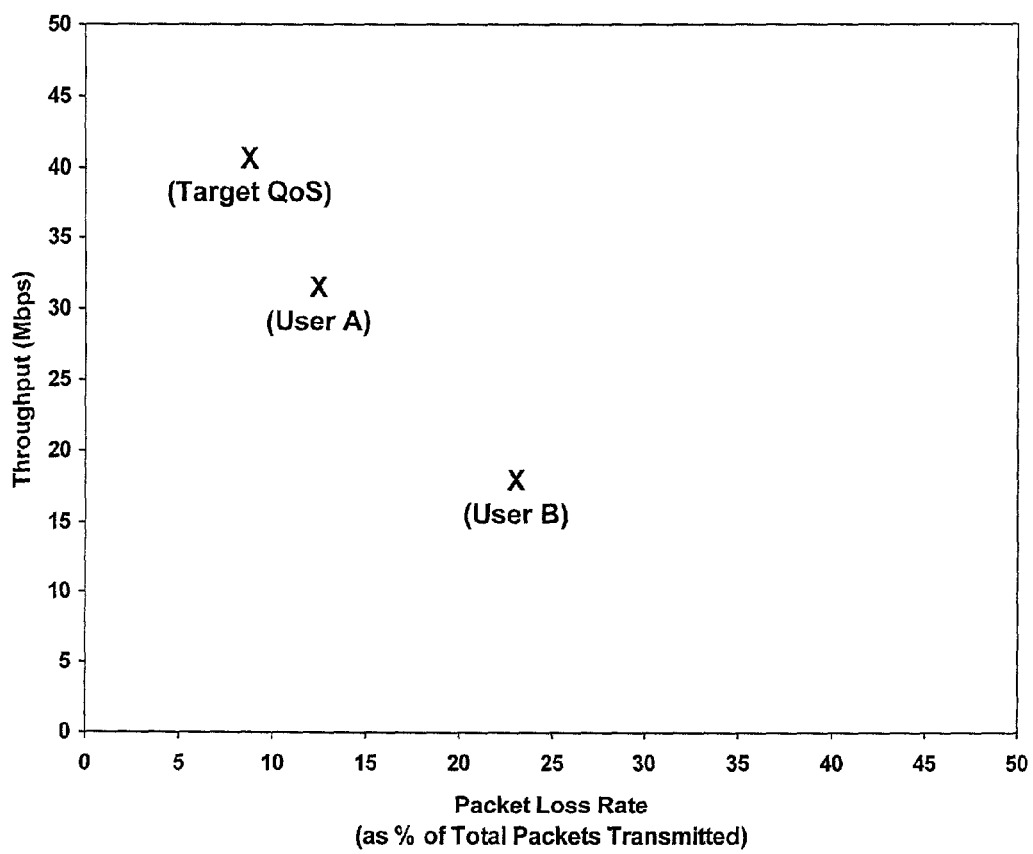
FIG. 10 illustrates a graph of user throughput rates versus user data loss rates for two users relative to a target minimum QoS standard.

An example of fairness considerations that may be utilized in determining priority is illustrated in FIG. 10, wherein user throughput for a time interval is graphed against user data packets dropped in the time interval for Users A and B. A target QoS standard for minimum throughput and maximum packet loss rates are established by the Carrier, whereby in the illustrated example each user is prioritized based on the user's absolute distance from the target QoS standard. Thus, under this policy, User A experiencing higher throughput rate and a lower packet loss rate, and thus having a shorter distance from the standard, is prioritized lower than User B having a lower throughput rate and higher data loss rate.

The Third Routine performed by the Bandwidth Allocator 92 is the determination of bandwidth allocations to the users for the future time interval in accordance with one or more of various allocation policies. Examples of such allocation policies include: (i) the equal distribution of all available bandwidth to all users; (ii) the distribution of all available bandwidth to all users proportional to each user's respective forecasted bandwidth; (iii) the distribution of bandwidth to each user equal to the user's respective forecasted bandwidth, with any surplus bandwidth being distributed to the users either equally or proportionally based upon the user's respective forecasted bandwidth; and (iv) the initial distribution of bandwidth to each user based upon the minimum of the user's guaranteed bandwidth or the forecasted bandwidth and, thereafter, incremental allocations of remaining bandwidth to all of the users.

Examples of alternate preferred methods of prioritizing users and allocating bandwidth by the Bandwidth Allocator 92 will now be described, each of which utilizes one or more of the aforementioned prioritization and allocation policies. Such methods preferably are initiated pursuant to the scheduling module 102 of the Bandwidth Allocator 92, which may operate independently of the scheduling module 100 of the Data Collector 88.

Figure 11:
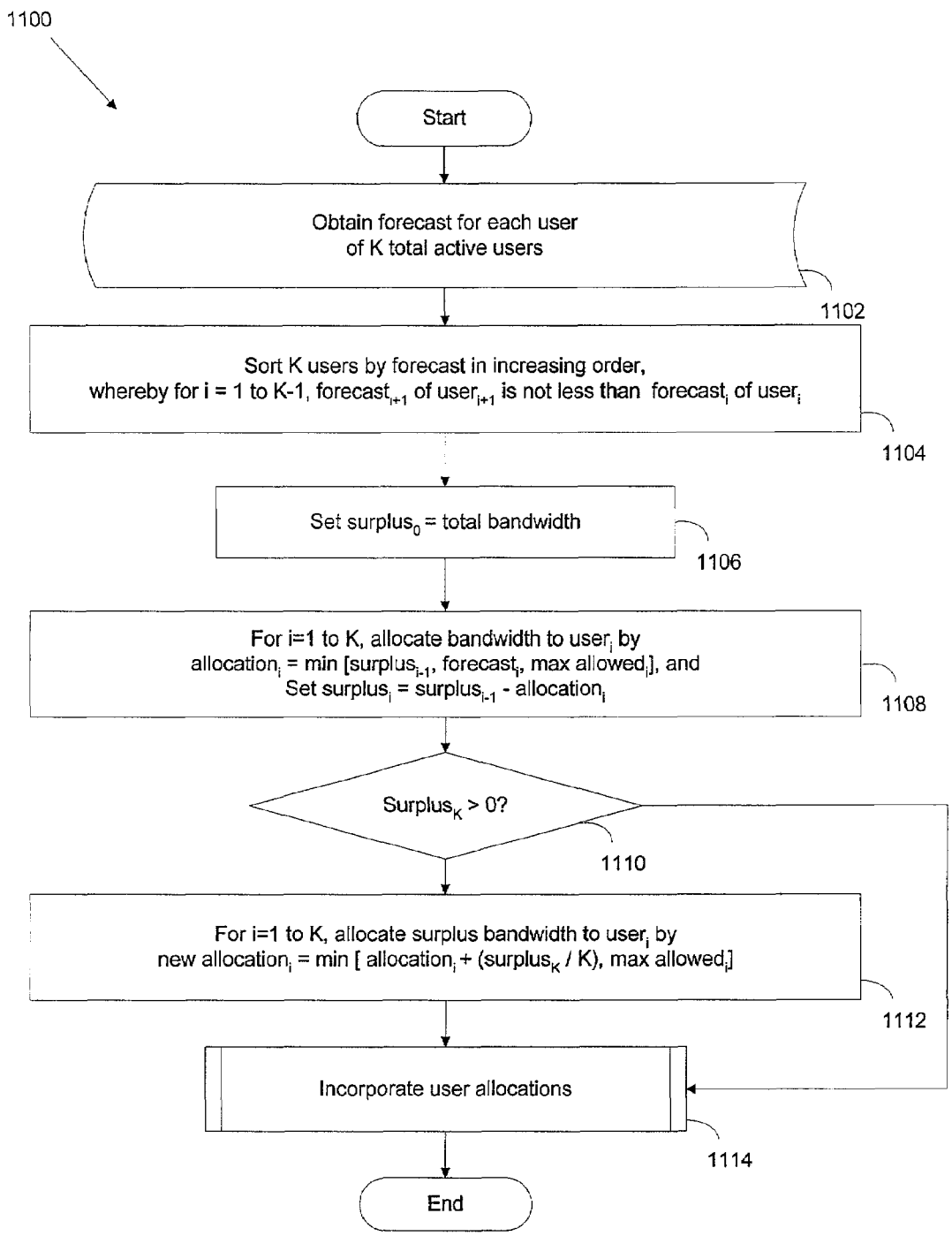
FIG. 11 illustrates a flowchart of a first preferred method of prioritizing users and allocating bandwidth.

Accordingly, a first method 1100 of prioritizing users and allocating bandwidth (whether upstream or downstream) by the Bandwidth Allocator 92 is illustrated in FIG. 11 and begins with the retrieval (Step 1102) of the forecasted bandwidth from the Database Manager 90 for all active users. Whether a user is active is determined by past bandwidth consumption of the user (or, alternatively, requested bandwidth for the user), as revealed by the user stats maintained by the Database Manager 90. All users are then prioritized (Step 1104) based on each user's forecast in increasing order, whereby users having lesser forecasted bandwidths will be prioritized over users having larger forecasted bandwidths. The "surplus" is then set (Step 1106) to the total bandwidth available in the particular direction of communication, and the total bandwidth is then allocated (Step 1108) to each user in an amount equaling the forecasted bandwidth subject to a respective maximum bandwidth value. Preferably the respective maximum bandwidth value is determined either in the user's SLA or by the Carrier, Administrator 106, or other entity. Allocation of bandwidth to a user additionally is subject to the actual availability of bandwidth following previous allocations thereof to users with equal or higher priority.

Following allocations to all users, any bandwidth determined (Step 1110) to be remaining is then allocated equally (Step 1112) to the users subject to each user's respective maximum bandwidth value. The resulting user allocations are then incorporated (Step 1114) into the DOC Network as the user bandwidth allowances, which incorporation is described in detail below.

Figure 12:
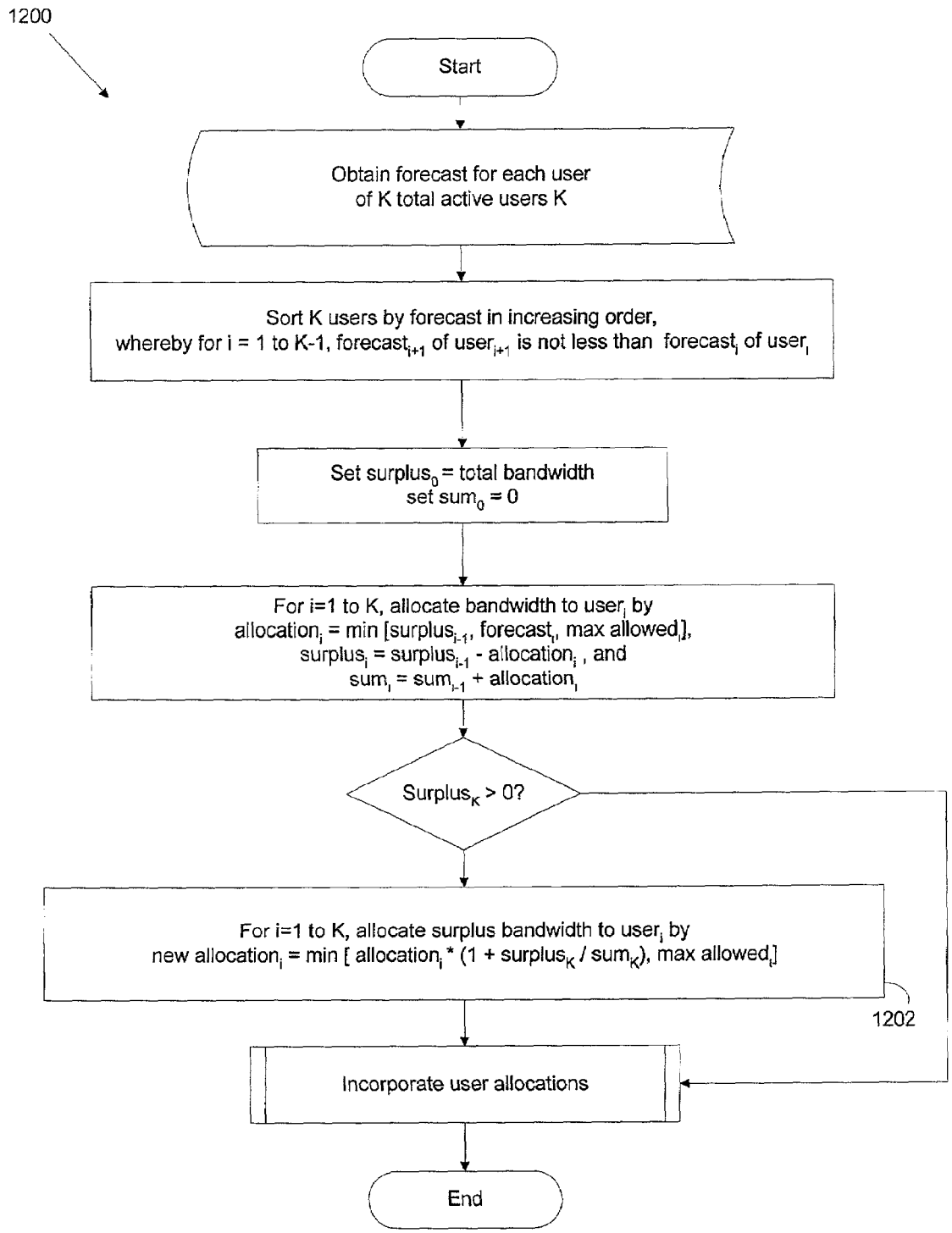
FIG. 12 illustrates a flowchart of a second preferred method of prioritizing users and allocating bandwidth.

The method 1200 illustrated in FIG. 12 is the same as that of FIG. 11, except that surplus bandwidth, if any, is allocated (Step 1202) proportional to the forecasted bandwidths of the users, again subject to each user's respective maximum bandwidth value.

Figure 13:
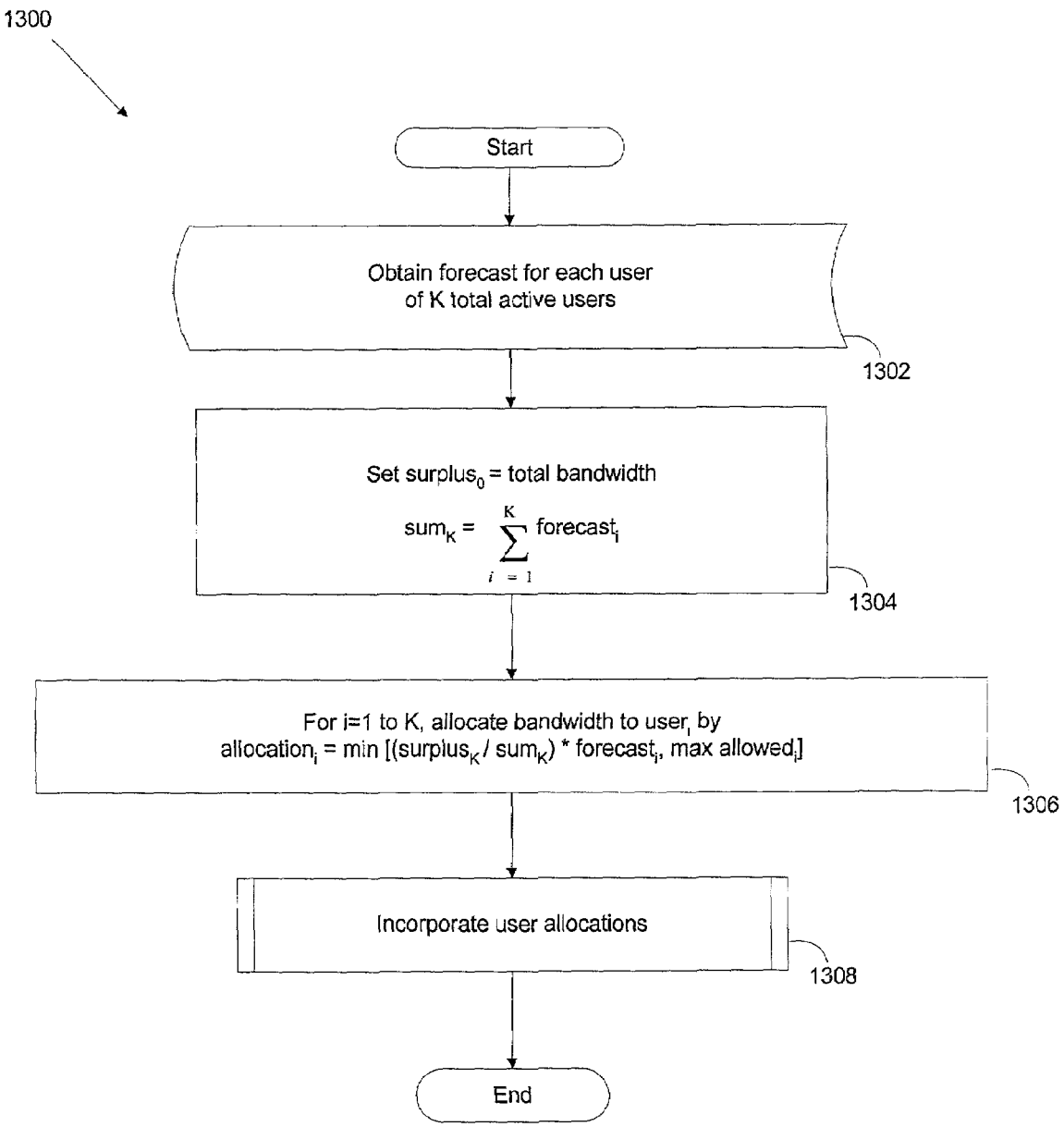
FIG. 13 illustrates a flowchart of a third preferred method of prioritizing users and allocating bandwidth.

The preferred method 1300 illustrated in FIG. 13 does not prioritize the users for purposes of allocation but, instead, treats all users equally. The method 1300 begins with the retrieval (Step 1302) of the forecasted bandwidth from the Database Manager 90 for all of the users. The surplus is then set to the total bandwidth available in the particular direction of communication, and the sum of all user's forecasts is calculated (Step 1304). The available bandwidth then is allocated (Step 1306) to all users proportional to the user's forecasted bandwidth, again subject to each user's maximum bandwidth value. The resulting user allocations then are incorporated into the DOC Network (Step 1308) as the user bandwidth allowances.

Figure 14:
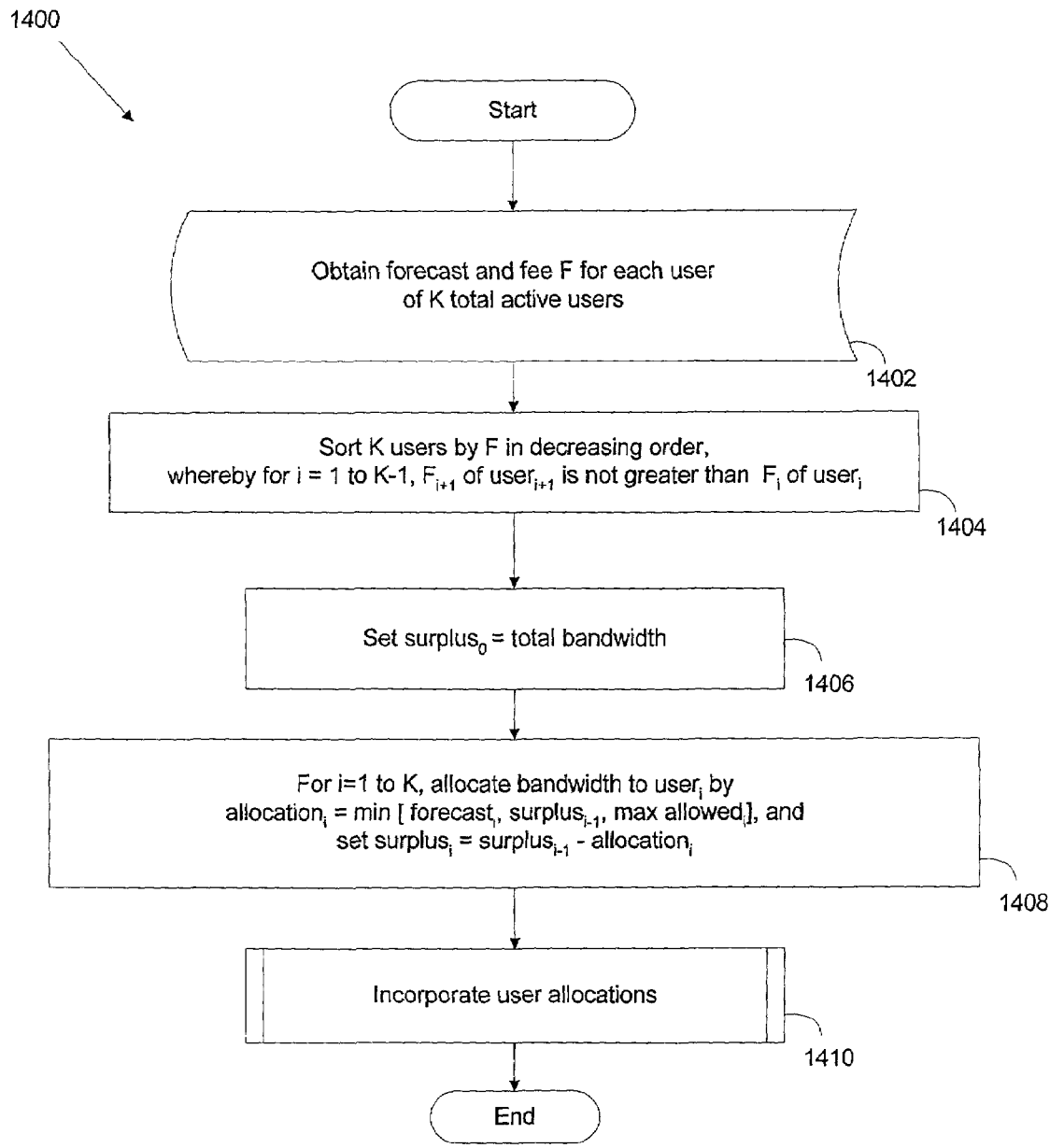
FIG. 14 illustrates a flowchart of a fourth preferred method of prioritizing users and allocating bandwidth.

The preferred method 1400 illustrated in FIG. 14 seeks to maximize revenues from fees (F) that are paid by users for bandwidth consumption. The method 1400 begins with the retrieval (Step 1402) of the forecast for each user as well as a fee which each user pays for bandwidth. The users are then sorted (Step 1404) based on user fees in decreasing order, with the user paying the most for bandwidth receiving the highest priority. Next, the surplus is set (Step 1406) to the total bandwidth available in the particular direction of communication. Available bandwidth then is allocated (Step 1408) to the users from highest to lowest priority in an amount equal to the user's forecasted bandwidth, subject to the respective maximum bandwidth value for the user.

Figure 15A:
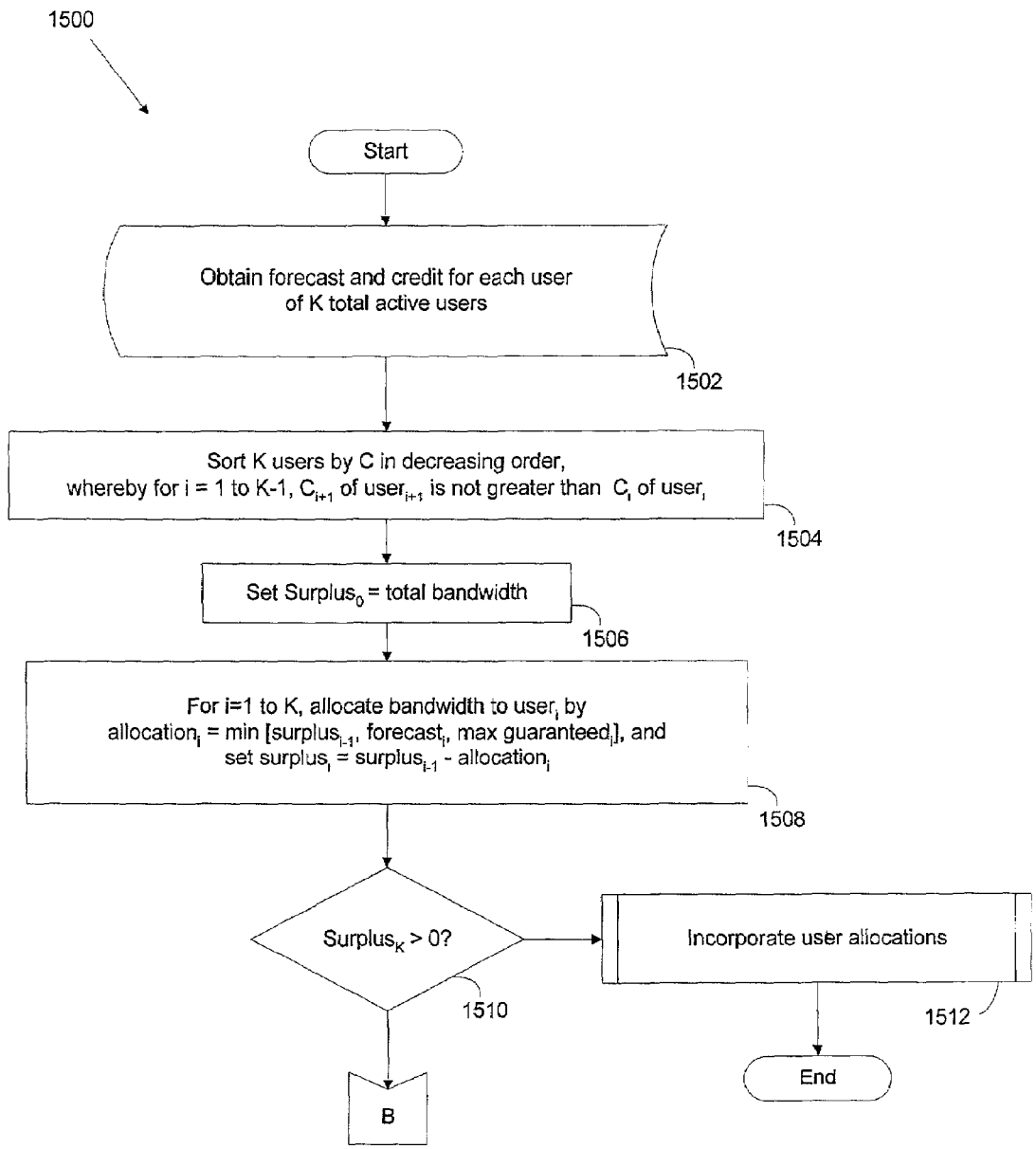
FIGS. 15A and 15B illustrate a flowchart of a fifth preferred method of prioritizing users and allocating bandwidth.
Figure 15B:
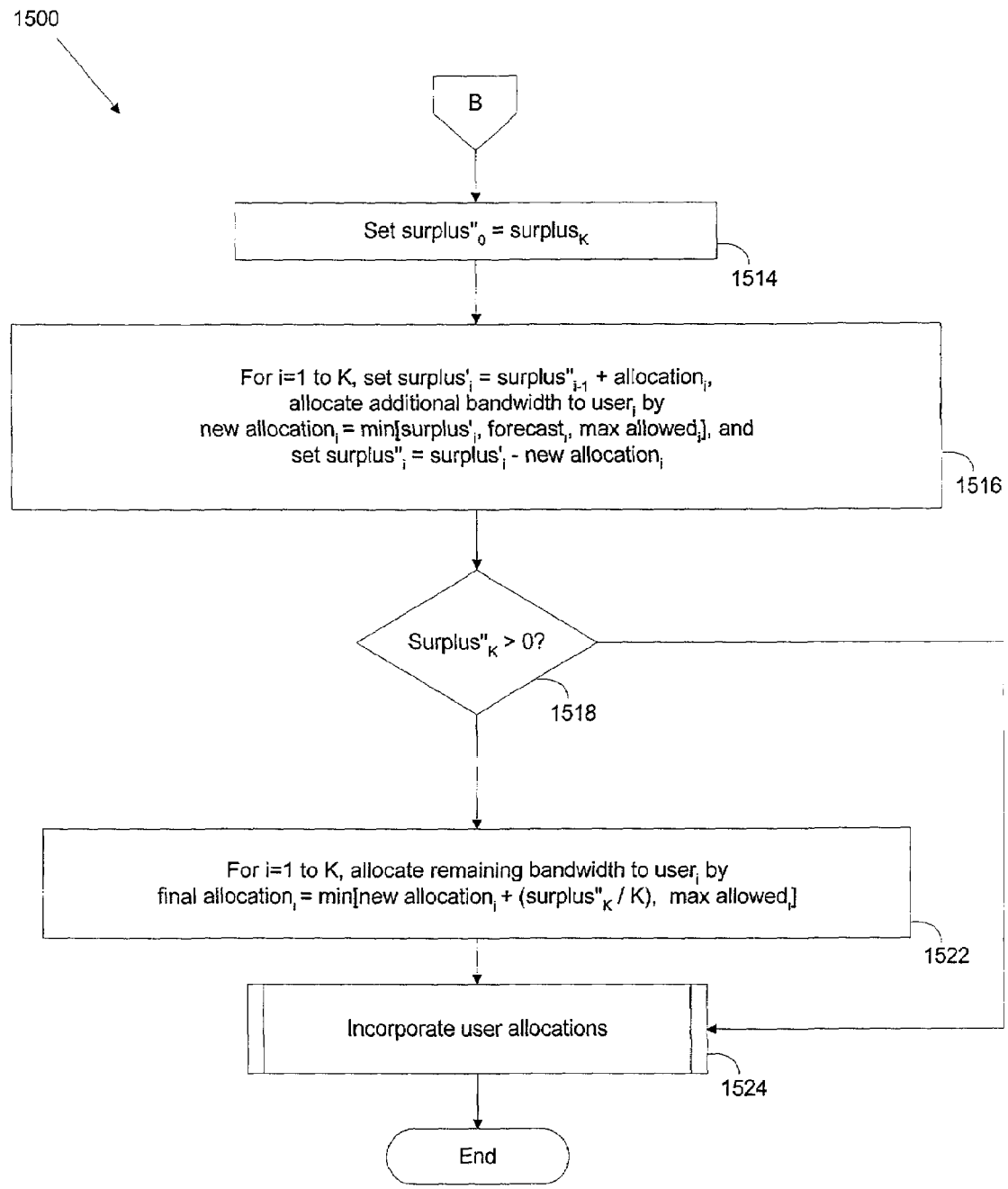
Figure 16A:
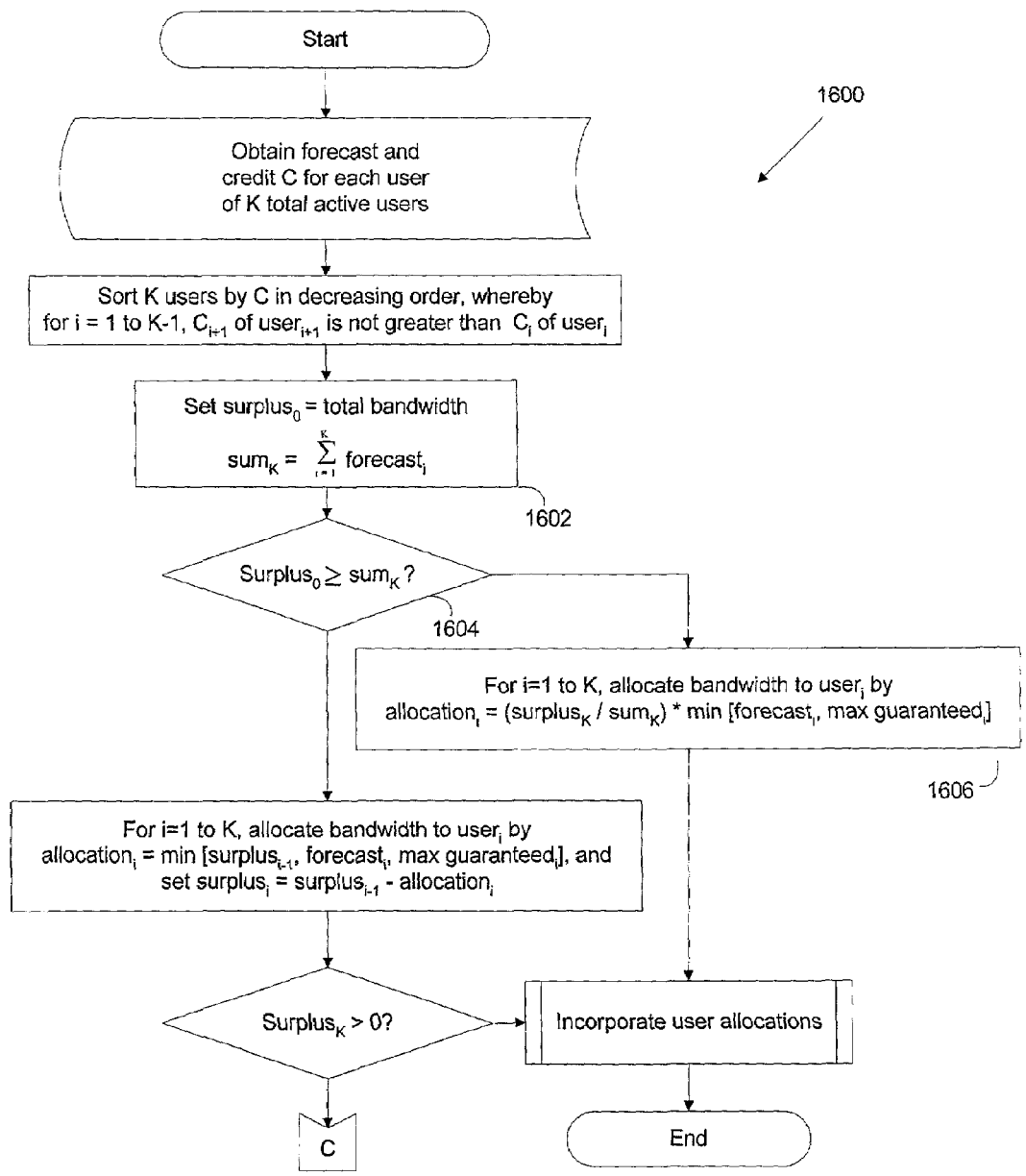
FIGS. 16A and 16B illustrate a flowchart of a sixth preferred method of prioritizing users and allocating bandwidth.
Figure 16B:
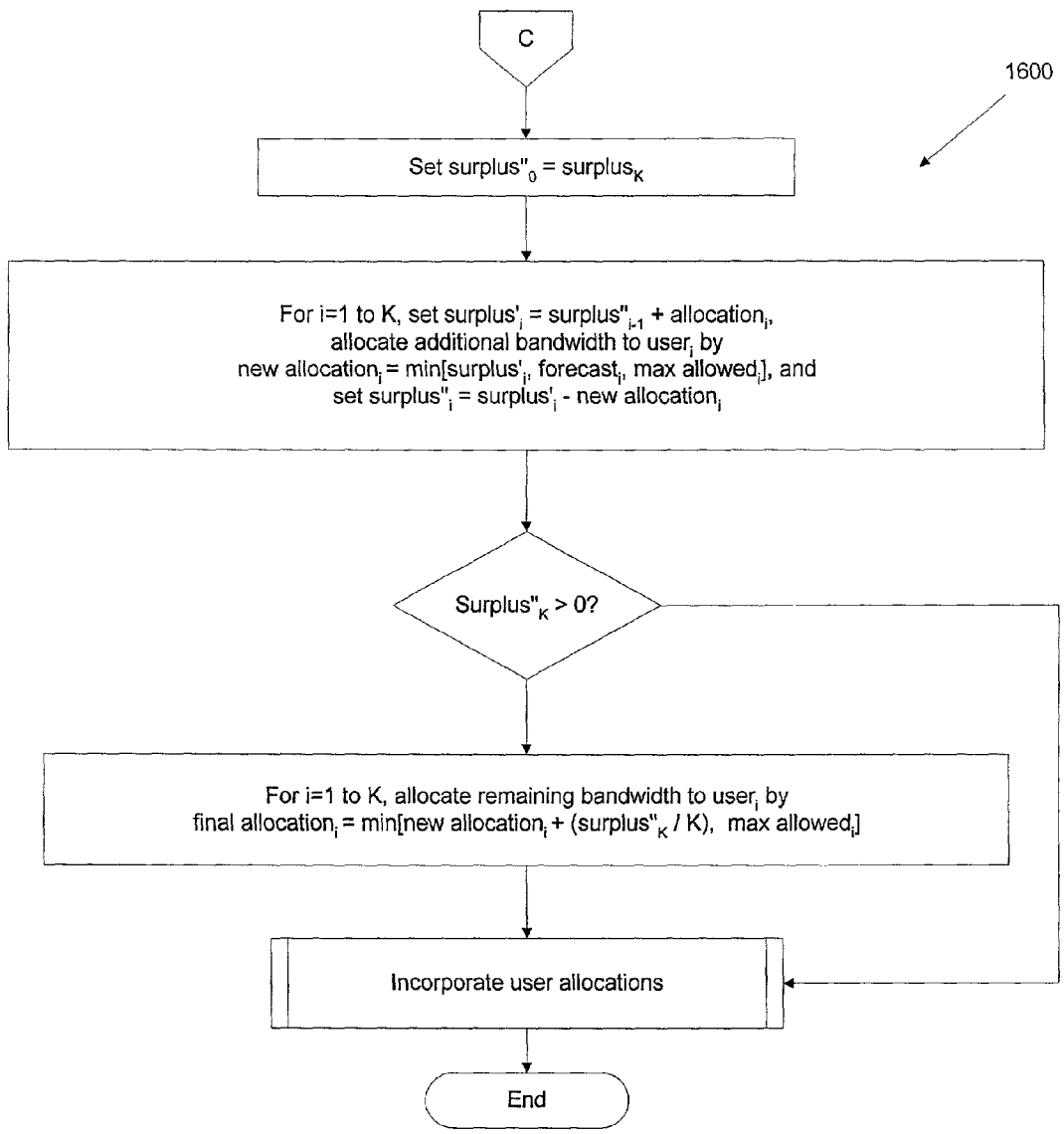

Both preferred method of 1500 of FIGS. 15A and 15B, and preferred method 1600 of FIGS. 16A and 16B differ from the other methods 1100, 1200, 1300, 1400 in that these two methods allocate bandwidth to the users in multiple allocation rounds. Method 1500 begins in FIG. 15A with the retrieval (Step 1502) of the forecasted bandwidths of the users as well as a credit (C) that applies if a respective user does not receive up to a guaranteed maximum level of bandwidth. The users are then prioritized (Step 1504) based on each user's respective credit in decreasing order, with those users having higher credits being given priority over users with lesser credits. Next, the surplus is set (Step 1506) to the total bandwidth available in the particular direction of communication. Available bandwidth then is allocated (Step 1508) as available in a first round to the users from highest to lowest priority. The allocation in the first round is equal to the minimum of the forecasted bandwidth or the maximum bandwidth that is guaranteed, subject to the respective maximum bandwidth value for each user.

If any additional bandwidth is determined (Step 1510) to remain after the first allocation round, then the surplus is set to the additional bandwidth (Step 1514). Bandwidth then is allocated (Step 1516) as available to each user in the same user order. Assuming sufficient bandwidth remains available, the allocation in the second round brings the user's allocation up to the user's forecasted bandwidth subject to the user's respective maximum bandwidth value. Following the second allocation round, a determination is made (Step 1518) whether any remaining bandwidth exists and, if so, then the remaining bandwidth is allocated (Step 1522) equally to the users, subject to each user's respective maximum bandwidth value. The resulting user allocations are then incorporated (Step 1524) into the DOC Network as the user bandwidth allowances. If it is determined that no bandwidth remains available in either of Step 1510 or Step 1518, then the user allocations are completed and are incorporated into DOC Network as the user bandwidth allowances in Steps 1512, 1524, respectively.

Method 1600 of FIGS. 16A and 16B differs from that of FIGS. 15A and 15B only in that the sum of the forecasted bandwidths for all users is calculated (Step 1602) and a determination is made (Step 1604) whether the sum exceeds the total bandwidth available to the users. If the sum exceeds the total bandwidth that is available to the users, then the bandwidth is allocated (Step 1606) to each user in an amount equal to the forecasted bandwidth, subject to the user's maximum guaranteed bandwidth, and less an amount thereof proportional to the total bandwidth shortfall. Thus, for example, if the sum of all forecasted bandwidths exceeds the total available bandwidth in an amount equal to 20% of the sum of all forecasted bandwidths, then each user is allocated bandwidth in an amount equal to the user's forecasted bandwidth (subject to the user's maximum guaranteed bandwidth), then less 20% thereof.

The information including fees, credits, guaranteed bandwidths, and respective maximum bandwidth values in the aforementioned preferred methods, is obtained from each user's SLA and/or is predetermined by the Administrator 106, Carrier, or other entity. Moreover, this information is retrieved by the Bandwidth Allocator 92 from the Database Manager 90, which includes and maintains a user SLA table as well as a user billing table, as updated from time-to-time by the Administrator 106. Specifically, the information is configured and maintained through GUIs provided as part of the GUI & Report Generating Engine 94, and is preferably accessed by the Administrator 106 either directly or indirectly through the Internet 60. Alternatively, information is retrieved by the Bandwidth Allocator 92 from an external database maintained by the Administrator, Carrier, or other entity through an application program interface (API) incorporated into the external system interface layer 98 of the Bandwidth Allocator 92. The use of an external database is preferred for the SLA and user billing tables, as it eliminates any duplicative maintenance of information otherwise maintained by the Database Manager 90 which must be synchronized with the external database, including periodic updating of user records in a timely fashion.

Regardless of the particular method or policies utilized by the Bandwidth Allocator 92, once user allocations have been determined, the respective DOC Network is updated with the user allocations as user bandwidth allowances for a particular time interval. Each user then utilizes bandwidth during the particular time interval in an amount that is less than, or equal to, that user's bandwidth allowance. Preferably, the DOC Network is updated at periodic intervals of between one to fifteen minutes and, preferably every five minutes. Furthermore, the periodic interval preferably corresponds to the scheduling of the Bandwidth Allocator 92 with regard to upstream transmissions.

Figure 17:
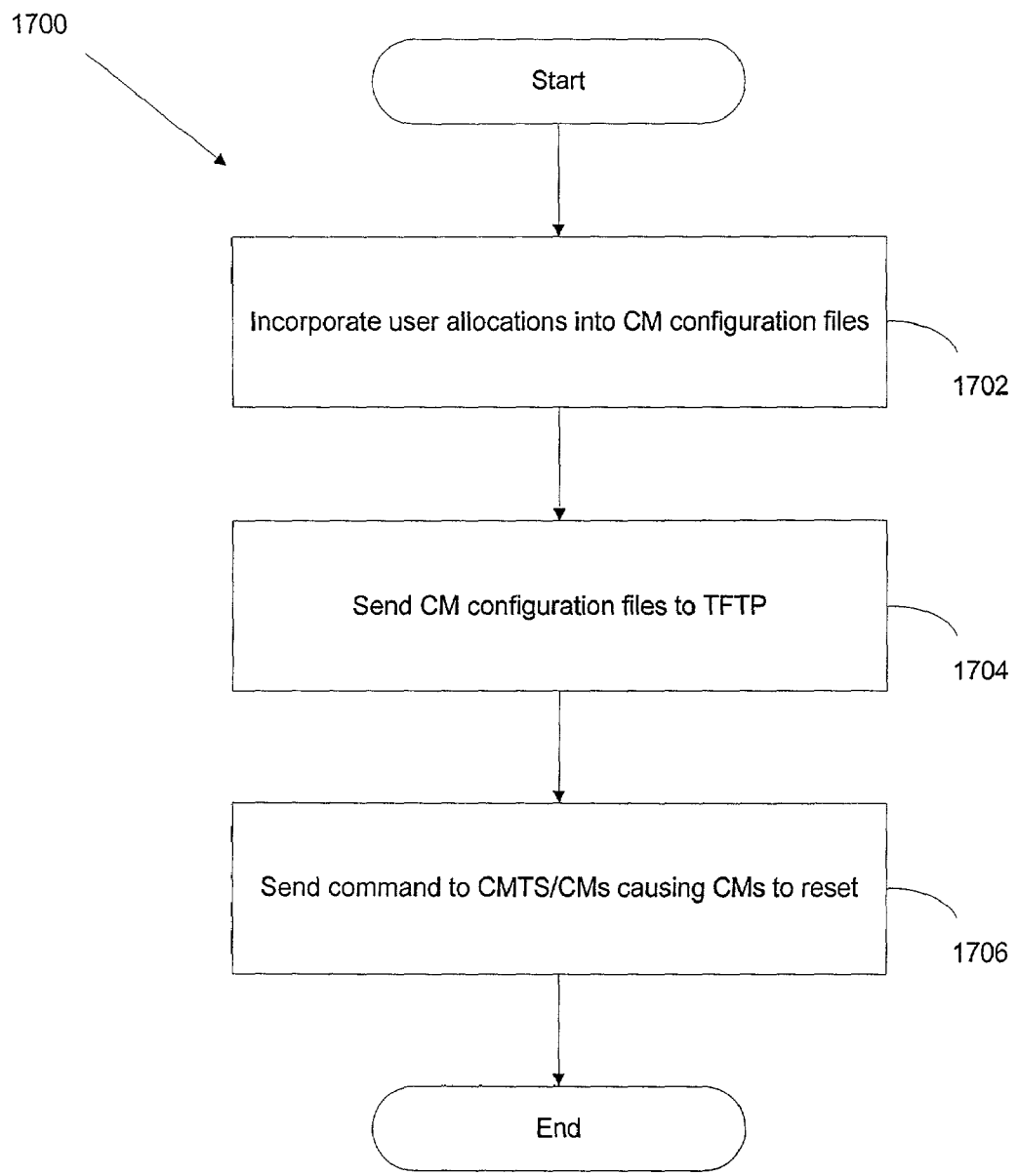
FIG. 17 illustrates a flowchart of a preferred method of updating a DOC Network for a DOCSIS 1.0 compliant Cable Network.

With particular reference to FIG. 17, a preferred method 1700 of updating a DOC Network for a DOCSIS 1.0 compliant Cable Network is illustrated. The DOC Network is updated by incorporating (Step 1702) the user allocations as bandwidth allowances (i.e., bandwidth limits) into CM configuration files (MD-5 files) for the CMs of the respective users. As set forth above, each CM configuration file contains instructions for a respective CM that limits the actual bandwidth consumed by the CM in the upstream direction and in the downstream direction. The CM configuration files are then sent (Step 1704) by the Bandwidth Allocator 92 to a Trivial File Transfer Protocol (TFTP) Server of the DOC Network, which maintains CM configuration files for the CMs of the Cable Network. A command is also sent (Step 1706) to either of the CMs or the CMTS of the respective Cable Network causing the CMs to acquire and implement the CM configuration files maintained on the TFTP Server.

In addition to maintaining information regarding SLAs and user billing data in the Database Manager 90, the GUI & Report Generating Engine 94 further enables the Administrator 106 to analyze the user stats updated by the Data Collector 88, including the generation of reports and graphs regarding, for example, network access usage of the users over time as well as user throughput rates vs. data loss rates similar to that shown in FIG. 10.

As now will readily be seen, the preferred methods and networks of the present invention described in detail above enable a Carrier to accommodate differing demands for instantaneous throughput by users competing for access across a shared communications medium. Indeed, Carriers now are able to continuously vary bandwidth consumption limits for each user between time intervals, either in accordance with fairness considerations, forecasted network access usage of the users, or under provisions governing network access agreed upon between users and the Carriers.

Additionally, it will now be evident that the present invention gives rise to new business models that may be implemented by Carriers for providing network access to users and, in particular, to new ways of constructing SLAs, which is also considered part of the present invention.

For example, Carriers now can offer a guaranteed minimum level of network access to a user that is constant throughout the day or week, or a guaranteed minimum level of network access that varies depending upon considerations such as the time of day or the day of week. Carriers also now can offer a guaranteed minimum level of network access with a guaranteed maximum level of network access provided as needed in accordance with a target probability. Furthermore, not only do these customizable SLAs provide users with greater options for improving performance levels of applications and services that utilize the Shared Access Carrier Networks, but they further enable Carriers to differentiate between users in charging for network access, thereby allowing Carriers to differentiate revenue streams for maximization of revenues.

Figure 20:
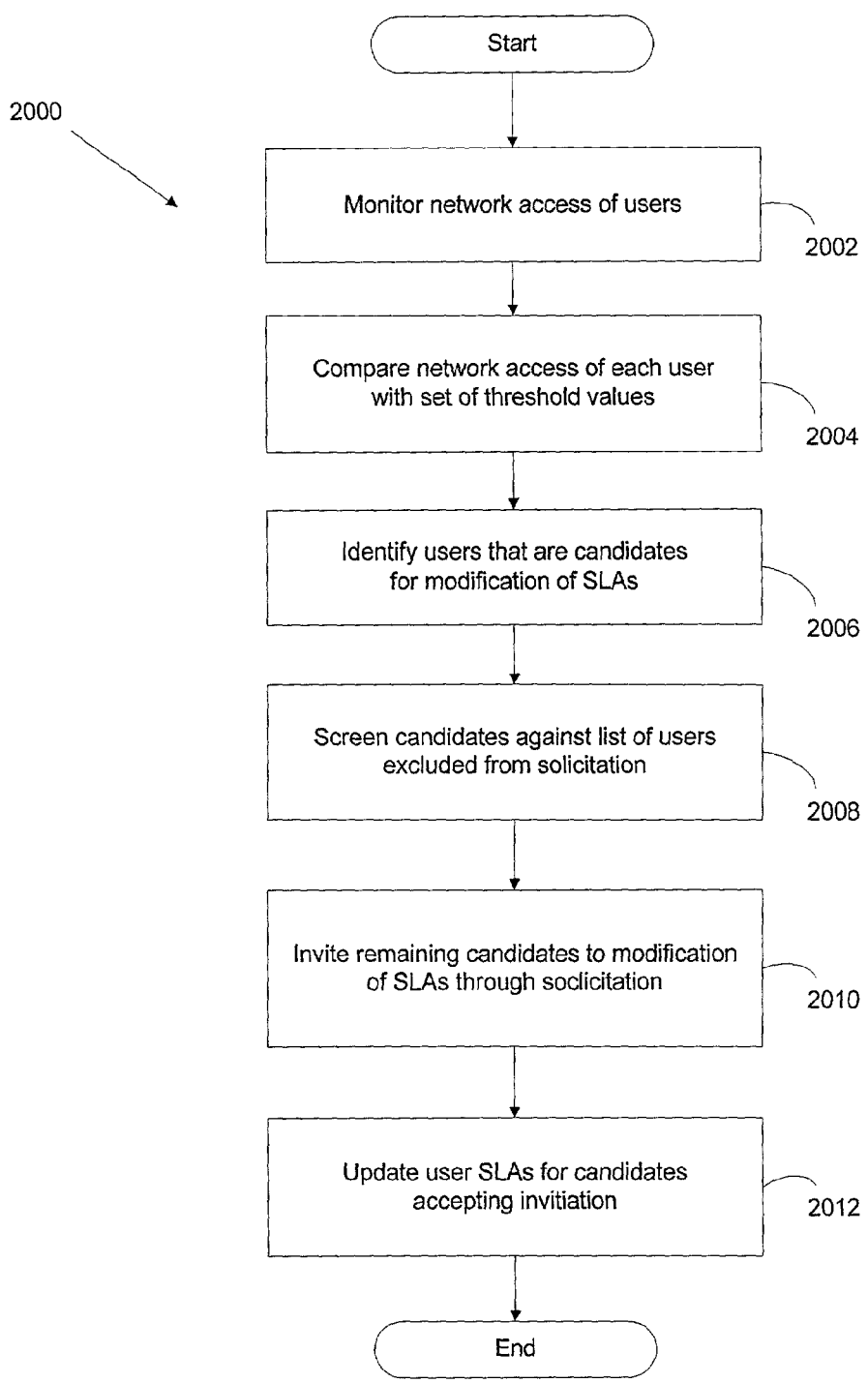
FIG. 20 illustrates a flowchart of a preferred method of soliciting a user to modify the user's SLA based on monitored network access usage of the user.

The present invention also enables Carriers to offer "dynamic SLAs" to users. The term "dynamic SLA" refers to a SLA that can be modified by a user as the user's demand for network access significantly changes, whether such modification is permanent or temporary. In this regard, and in accordance with a preferred method 2000 of the present invention as illustrated in FIG. 20, a Carrier monitors (Step 2002) network access usage by users of a Shared Access Carrier Network and determines (Step 2004), for each user based on network access usage, whether a SLA provision other than those found in the user's current SLA would better meet the user's needs. This determination is made by comparing the user's throughput, bandwidth consumption, and/or bandwidth requested for a predetermined period of time against a set of threshold values, including any guaranteed level of network access provided for in the user's SLA as well as any minimum QoS standard that are deemed necessary for user satisfaction by the Administrator 106, Carrier, or other entity. Thus, if the user's level of throughput, bandwidth consumption, and/or bandwidth requested for the predetermined time interval differs by a predetermined tolerance from a respective minimum threshold value, then the user is identified (Step 2006) as a "candidate" for modifying the SLA. A similar process alternatively is used, wherein the user's forecasted bandwidth is compared to the threshold values and, if the difference exceeds a predetermined tolerance, then the user is deemed a candidate for modifying the user's SLA.

Once users have been identified as candidates, the candidates are filtered by screening (Step 2008) the candidates against a list of users for which solicitations are not to be made. Those candidates passing the screening are then invited (Step 2010) to modify their respective SLAs. The solicitation of the user preferably is performed via email, instant messaging, redirection of the user's web browser to a solicitation web page, generation and mailing of solicitation literature via U.S. mail, telemarketing, or other means of communication. The solicitation includes an invitation for the user to modify the user's SLA by increasing for a fee the minimum level of network access guaranteed to the user. The solicitation preferably also includes an invitation to make the modification permanent, or to make the modification only temporary and for a specific period of time.

Thus, for example, if a user is identified as having a high usage pattern at recurrent periods of time (such as every Saturday night when a particular webcast is viewed, or when an Internet game is played), then the user automatically is solicited with an invitation via instant messaging on the following Saturday night to increase the user's guaranteed network access for that night, for a predetermined number of following Saturday nights, and/or for every Saturday night.

Acceptance of the invitation by each user results in the modification (Step 2012) of the user's SLA for the appropriate period of time by increasing the level of network access the user is guaranteed (and/or the user's respective maximum bandwidth value, depending upon the policies used). The solicited modification to the user's SLA is updated in the SLA database, which is then used during user prioritization and allocation of bandwidth by the Bandwidth Allocator 92. The resulting higher bandwidth allowance should enhance the user's experience and overall satisfaction with the Carrier Network. In particular, the higher bandwidth (greater network access) should enhance the viewing of the webcast or the playing of the Internet game.

On the other hand, SLAs for which users decline solicitations are not modified. Furthermore, if deemed appropriate, users declining a solicitation are recorded in the list against which candidates are screened.

Preferably, the Bandwidth Allocator 92 analyzes the user stats maintained by the Database Manager 90, identifies those users that are candidates for SLA modification, and initiates the solicitation of such candidates. Information for each user's SLA for comparison with the user's stats automatically is obtained either from the Database Manager 90, or from an external database maintained by the Administrator 106, Carrier, or other entity. Furthermore, the Bandwidth Allocator 92 preferably performs this analysis for solicitation on a regularly scheduled basis.

In addition to such solicitations, a user of course may request a change in the level of network access guaranteed without having to first receive a solicitation. Furthermore, the user may request that the change be for a temporary period of time such that, for example, the change is reversed after only a few hours, which would cover a viewing of a particular webcast or the playing of a particular Internet game beginning at the time of the request.

In view of the foregoing detailed description of the preferred embodiments and methods of the present invention, it readily will be understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to preferred embodiments, it is to be understood that this disclosure only is illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

Thus, for example, it will be apparent that, while preferred embodiments of the present invention have been described in the context of DOC Networks (including either a network of all coaxial cable, or a HFC network), the present invention nevertheless relates to any other network (whether wireline or wireless) wherein competing users share access across a shared communications medium including, for example, home networks and small networks in mass transit vehicles.

What is claimed is:

1. A method of providing network access across a shared communications medium between competing users, comprising the steps of:
   (a) monitoring network access usage by each user during a time interval, wherein said step of monitoring network access usage includes collecting data representative of the number of logical data units of the user that are dropped during a time interval;
   (b) based on said monitoring, forecasting network access usage by each user over a future time interval;
   (c) prioritizing users based on each user's forecasted network access usage in increasing order, whereby a user with a lesser forecasted network access usage receives a higher priority than a user with a greater forecasted network access usage; and
   (d) allocating network access available to each user during the future time interval in decreasing order of user priority, each user's allocation of network access being equal to each user's forecasted network access usage subject to a respective, predetermined maximum value and subject to availability.

2. The method of claim 1, wherein said step of allocating further comprises allocating any surplus network access remaining equally to the users.

3. The method of claim 1, wherein said step of allocating further comprises allocating in decreasing user priority any surplus network access to the users proportionally to the user's forecasted network access usage.

4. The method of claim 1, wherein network access comprises bandwidth across the shared communications medium for consumption by each user in conveying data of the user.

5. The method of claim 1, wherein said step of monitoring comprises monitoring network access usage by the users in an upstream direction at time intervals of one minute to fifteen minutes.

6. The method of claim 1, wherein said step of monitoring comprises monitoring network access usage by the users in a downstream direction at time intervals of fifteen minutes to sixty minutes.

7. The method of claim 1, wherein the time interval for which network access usage is monitored and the future time interval are equal in length.

8. The method of claim 1, wherein the time interval for which network access usage is monitored and the future time interval each is approximately one minute to sixty minutes in length.

9. The method of claim 1, wherein said step of monitoring network access usage includes collecting data representative of the number of logical data units transmitted from and to each user during a time interval.

10. The method of claim 1, wherein said step of monitoring network access usage includes collecting data representative of the number of bytes and data packets transmitted from and to each user during a time interval.

11. The method of claim 1, wherein said step of monitoring network access usage includes collecting data representative of the number of logical data units of the user that are requested to be transmitted in the upstream direction during a time interval.

12. The method of claim 1, wherein the shared communications medium is part of a Shared Access Carrier Network.

13. The method of claim 12, wherein the Shared Access Carrier Network comprises a Cable Network and the shared communications medium comprises a coaxial cable.

14. The method of claim 12, wherein the Shared Access Carrier Network comprises a wireless network.

15. A method of providing network access across a shared communications medium between competing users, comprising the steps of:
   (a) monitoring network access usage by each user during a time interval, wherein said step of monitoring network access usage includes collecting data representative of the number of bytes and data packets of the user that are dropped during a time interval;
   (b) based on said monitoring, forecasting network access usage by each user over a future time interval;
   (c) prioritizing users based on each user's forecasted network access usage in increasing order, whereby a user with a lesser forecasted network access usage receives a higher priority than a user with a greater forecasted network access usage; and
   d) allocating network access available to each user during the future time interval in decreasing order of user priority, each user's allocation of network access being equal to each user's forecasted network access usage subject to a respective, predetermined maximum value and subject to availability.

16. A method of providing network access across a shared communications medium between competing users, comprising the steps of:
   (a) charging each user a respective fee for network access usage;
   (b) monitoring network access usage by each user during a time interval, wherein said step of monitoring network access usage includes collecting data representative of the number of logical data units of the user that are dropped during a time interval;
   (c) based on said monitoring, forecasting network access usage by each user over a future time interval;
   (d) prioritizing users based on each user's fee in decreasing order, whereby a user having a greater fee receives a higher priority than a user having a lesser fee; and
   (e) allocating network access available to each user during the future time interval in decreasing order of user priority, each user's allocation of network access being equal to each user's forecasted network access usage subject to a respective, predetermined maximum value and subject to availability.

17. The method of claim 16, wherein network access comprises bandwidth across the shared communications medium for consumption by each user in conveying data of the user.

18. The method of claim 16, wherein said step of monitoring comprises monitoring network access usage by the users in an upstream direction at time intervals of one minute to fifteen minutes.

19. The method of claim 16, wherein said step of monitoring comprises monitoring network access usage by the users in a downstream direction at time intervals of fifteen minutes to sixty minutes.

20. The method of claim 16, wherein the time interval for which network access usage is monitored and the future time interval are equal in length.

21. The method of claim 16, wherein the time interval for which network access usage is monitored and the future time interval each is approximately one minute to sixty minutes in length.

22. The method of claim 16, wherein said step of monitoring network access includes collecting data representative of the number of logical data units transmitted from and to each user during a time interval.

23. The method of claim 16, wherein said step of monitoring network access usage includes collecting data representative of the number of bytes and data packets transmitted from and to each user during a time interval.

24. The method of claim 16, wherein said step of monitoring network access usage includes collecting data representative of the number of logical data units of the user that are requested to be transmitted in the upstream direction during a time interval.

25. The method of claim 16, wherein the shared communications medium is part of a Shared Access Carrier Network.

26. The method of claim 25, wherein the Shared Access Carrier Network comprises a Cable Network and the shared communications medium comprises a coaxial cable.

27. The method of claim 25, wherein the Shared Access Carrier Network comprises a wireless network.

28. A method of providing network access across a shared communications medium between competing users, comprising the steps of:
(a) charging each user a respective fee for network access usage;
(b) monitoring network access usage by each user during a time interval, wherein said step of monitoring network access usage includes collecting data representative of the number of bytes and data packets of the user that are dropped during a time interval;
(c) based on said monitoring, forecasting network access usage by each user over a future time interval;
(d) prioritizing users based on each user's fee in decreasing order, whereby a user having a greater fee receives a higher priority than a user having a lesser fee; and
(e) allocating network access available to each user during the future time interval in decreasing order of user priority, each user's allocation of network access being equal to each users forecasted network access usage subject to a respective, predetermined maximum value and subject to availability.

29. A method of providing network access across a shared communications medium between competing users, comprising the steps of:
(a) applying respective credits to users for network access shortfalls below respective levels of network access specified to the users;
(b) monitoring network access usage by each user during a past time interval, wherein said step of monitoring network access usage includes collecting data representative of the number of logical data units of each user that are dropped during a time interval;
(c) based on said monitoring, forecasting network access usage by each user over a future time interval;
(d) prioritizing users based on each user's respective credit in decreasing order, whereby a user having a greater credit receives a higher priority than a user having a lesser credit; and
(e) allocating network access available to each user during the future time interval in decreasing order of user priority, each user's allocation of network access being equal to each user's forecasted network access usage subject to a respective, predetermined maximum specified value and subject to availability.

30. The method of claim 29, wherein any additional network access remaining after said allocation is earmarked for the users such that each user's allocation equals the user's forecasted network access usage, subject to a respective, predetermined maximum allowed level of network access and subject to availability.

31. The method of claim 30, wherein any surplus network access remaining after said distribution is further earmarked in equal amounts for the users, subject to a respective, predetermined maximum allowed level of network access.

32. The method of claim 29, wherein network access comprises bandwidth across the shared communications medium for consumption by each user in conveying data of the user.

33. The method of claim 29, wherein said step of monitoring comprises monitoring network access usage by the users in an upstream direction at time intervals of one minute to fifteen minutes.

34. The method of claim 29, wherein said step of monitoring comprises monitoring network access by the users in a downstream direction at time intervals of fifteen minutes to sixty minutes.

35. The method of claim 29, wherein the time interval for which network access usage is monitored and the future time interval are equal in length.

36. The method of claim 29, wherein the time interval for which network access usage is monitored and the future time interval each is approximately one minute to sixty minutes in length.

37. The method of claim 29, wherein said step of monitoring network access usage includes collecting data representative of the number of logical data units transmitted from and to each user during a time interval.

38. The method of claim 29, wherein said step of monitoring network access usage includes collecting data representative of the number of bytes and data packets transmitted from and to each user during a time interval.

39. The method of claim 29, wherein said step of monitoring network access usage includes collecting data representative of the number of logical data units of each user that are requested to be transmitted in the upstream direction during a time interval.

40. The method of claim 29, wherein the shared communications medium is part of a Shared Access Carrier Network.

41. The method of claim 40, wherein the Shared Access Carrier Network comprises a Cable Network and the shared communications medium comprises a coaxial cable.

42. The method of claim 40, wherein the Shared Access Carrier Network comprises a wireless network.

43. A method of providing network access across a shared communications medium between competing users, comprising the steps of:
(a) applying respective credits to users for network access shortfalls below respective levels of network access specified to the users;
(b) monitoring network access usage by each user during a past time interval;
(c) based on said monitoring, forecasting network access usage by each user over a future time interval;
(d) prioritizing users based on each user's respective credit in decreasing order, whereby a user having a greater credit receives a higher priority than a user having a lesser credit; and
(e) allocating network access available to each user during the future time interval in decreasing order of user priority, each user's allocation of network access being equal to each user's forecasted network access usage subject to a respective, predetermined maximum specified value and subject to availability; and
(f) allocating to the users network access only in an amount equal to the forecasted network access usage multiplied by the ratio of total network access available for allocation to the total forecasted network access usage of the users, but only when the total forecasted network access usage of the users exceeds the total network access available for allocation, wherein any additional network access remaining after said allocation is earmarked for the users such that each user's allocation equals the user's forecasted network access usage, subject to a respective, predetermined maximum allowed level of network access and subject to availability.

44. A method of providing network access across a shared communications medium between competing users, comprising the steps of:
    (a) applying respective credits to users for network access shortfalls below respective levels of network access specified to the users;
    (b) monitoring network access usage by each user during a past time interval, wherein said step of monitoring network access usage includes collecting data representative of the number of bytes and data packets of each user that are dropped during a time interval;
    (c) based on said monitoring, forecasting network access usage by each user over a future time interval;
    (d) prioritizing users based on each user's respective credit in decreasing order, whereby a user having a greater credit receives a higher priority than a user having a lesser credit; and
    (e) allocating network access available to each user during the future time interval in decreasing order of user priority, each user's allocation of network access being equal to each users forecasted network access usage subject to a respective, predetermined maximum specified value and subject to availability.

45. A method of providing network access across a shared communications medium between competing users, comprising the steps of:
    (a) monitoring network access usage by each user during a time interval;
    (b) based on said monitoring, forecasting network access usage by each user over a future time interval, wherein forecasting comprises utilizing at least one smoothing function;
    (c) prioritizing users based on each user's forecasted network access usage in increasing order, whereby a user with a lesser forecasted network access usage receives a higher priority than a user with a greater forecasted network access usage; and
    (d) allocating network access available to each user during the future time interval in decreasing order of user priority, each user's allocation of network access being equal to each user's forecasted network access usage subject to a respective, predetermined maximum value and subject to availability.

46. The method of claim 45, wherein the smoothing function comprises a Holt-Winters' Seasonal Exponential Smoothing function (HW function).

47. The method of claim 45, wherein the smoothing function comprises an Adaptive-Response-Rate Single Exponential Smoothing function (ARRSES).

* * * * *